United States Patent
Pai et al.

(10) Patent No.: US 10,140,745 B2
(45) Date of Patent: Nov. 27, 2018

(54) METHODS AND SYSTEMS FOR COMPUTER-BASED ANIMATION OF MUSCULOSKELETAL SYSTEMS

(71) Applicant: Vital Mechanics Research Inc., Vancouver (CA)

(72) Inventors: Dinesh Kochikar Pai, Vancouver (CA); Ye Fan, Vancouver (CA)

(73) Assignee: Vital Mechanics Research Inc., Vancouver, British Columbia (CA)

( * ) Notice: Subject to any disclaimer, the term of this patent is extended or adjusted under 35 U.S.C. 154(b) by 257 days.

(21) Appl. No.: 14/992,853

(22) Filed: Jan. 11, 2016

(65) Prior Publication Data

US 2016/0203630 A1 Jul. 14, 2016

Related U.S. Application Data

(60) Provisional application No. 62/101,977, filed on Jan. 9, 2015.

(51) Int. Cl.
*G06T 13/40* (2011.01)

(52) U.S. Cl.
CPC ..................... *G06T 13/40* (2013.01)

(58) Field of Classification Search
CPC ...................................................... G06T 13/40
See application file for complete search history.

(56) References Cited

U.S. PATENT DOCUMENTS

| | | | |
|---|---|---|---|
| 6,266,071 B1 | 7/2001 | Stam et al. | |
| 8,140,304 B2 | 3/2012 | Ko et al. | |
| 2002/0042703 A1* | 4/2002 | Furusu | G09B 23/30 703/11 |
| 2006/0139347 A1 | 6/2006 | Choi et al. | |

(Continued)

OTHER PUBLICATIONS

"Eulerian Finite Volume Method for Musculoskeletal Simulation and Data-driven Activation", Fan Ye, Master's Thesis, Jul. 9, 2013.*

(Continued)

*Primary Examiner* — Jitesh Patel
(74) *Attorney, Agent, or Firm* — Todd A. Rattray; Oyen Wiggs Green & Mutala LLP

(57) ABSTRACT

A computer-implemented method simulates a shape of a musculoskeletal system comprising a skeletal subsystem and a soft-tissue subsystem. The method comprises: simulating, by the computer system, an evolution of a skeletal subsystem model over a series of time steps to thereby determine rigid body variables representative of the shapes of the one or more rigid bodies in a physical space at each time step; and simulating, by the computer system, an evolution of a soft-tissue subsystem model over the series of time steps to thereby determine, for each of the one or more soft tissue objects, a soft-tissue object representation in an Eulerian space and an associated Eulerian representation for each vertex in the Eulerian space at each time step, the associated Eulerian representation, for each vertex and for each time step, specifying which one or more material space coordinates for the soft-tissue object correspond to the vertex at the time step. The simulation comprises coupling the skeletal and soft-tissue subsystem models using one or more coupling constraints, which constraining available solutions to the skeletal and soft-tissue subsystem models over the series of time steps. The simulation results (e.g. the rigid body variables and the soft-tissue object representation) may be saved and optionally used to render or otherwise generate an animation comprising, for each of the series of time steps, a digital image of the musculoskeletal system.

35 Claims, 10 Drawing Sheets

(56) References Cited

U.S. PATENT DOCUMENTS

| | | | |
|---|---|---|---|
| 2007/0172797 A1* | 7/2007 | Hada | G09B 23/32 434/1 |
| 2007/0299551 A1* | 12/2007 | Weinzweig | G06F 19/3437 700/90 |
| 2008/0159608 A1* | 7/2008 | Suetens | G06T 19/20 382/128 |
| 2008/0221487 A1* | 9/2008 | Zohar | A61B 5/103 600/595 |
| 2009/0135189 A1* | 5/2009 | Kim | G06T 13/40 345/473 |
| 2010/0178644 A1* | 7/2010 | Meglan | G16H 50/50 434/267 |
| 2012/0281019 A1 | 11/2012 | Tamstorf et al. | |
| 2013/0088497 A1 | 4/2013 | Dilorenzo et al. | |
| 2014/0072175 A1* | 3/2014 | Hasler | G06K 9/00536 382/103 |

OTHER PUBLICATIONS

Musculotendon Simulation for Hand Animation, Sueda et al, Sensorimotor Systems Lab, Univ. of British Columbia, Aug. 2008.*

Gelder, "Approximate Simulation of Elastic Membranes by Triangulated Spring Meshes", University of California Santa Cruz, pp. 1-16, Mar. 18, 2004, first published in Journal of Graphics Tools, vol. 3 Issue 2, pp. 21-42, Feb. 1, 1998 (Feb. 1, 1998).

Li et al., "Thin Skin Elastodynamics", ACM Transactions on Graphics (TOG)—Proceedings of SIGGRAPH 2013 Conference, vol. 32, Issue 4, Article No. 49, Jul. 2013 (Jul. 1, 2013).

Fan, Y., Levin, D. I. W., Litven, J., and Pai, D. K., 2013. Eulerian-on-Lagrangian simulation, ACM Transactions on Graphics (TOG), vol. 32, Issue 3, Jun. 2013, Article 22.

Kry, P. G., James, D. L., and Pai, D. K. 2002. Eigenskin: real time large deformation character skinning in hardware. In ACM SIGGRAPH/Eurographics Symposium on Computer Animation, 153-159.

Levin, D. I. W., Litven, J., Jones, G. L., Sueda, S., and Pai, D. K. 2011. Eulerian solid simulation with contact. ACM Trans. Graph. 30, 4 (July), 36:1-36:9.

Sueda, S., Kaufman, A., and Pai, D. K. 2008. Musculotendon simulation for hand animation. ACM Trans. Graph. 27, 3 (Aug.), 83:1-83:8.

Sueda, S., Jones, G. L., Levin, D. I. W., and Pai, D. K. 2011. Large-scale dynamic simulation of highly constrained strands. ACM Trans. Graph. 30, 4 (July), 39:1-39:9.

* cited by examiner

PASSIVE MUSCLE SHAPE

ACTIVE MUSCLE SHAPE

ISOMETRIC WITHOUT ACTIVATION

ISOMETRIC WITH ACTIVATION

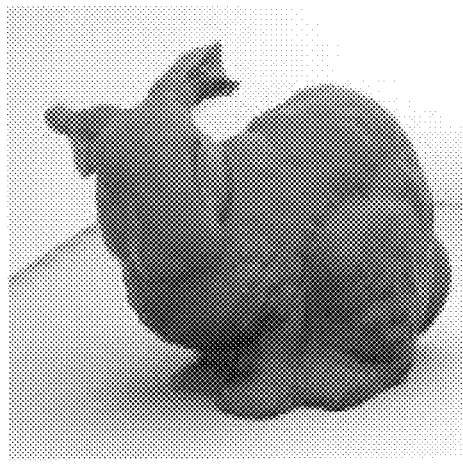
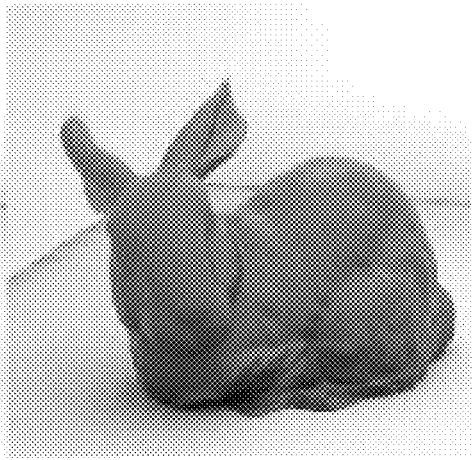
FIGURE 7A    FIGURE 7B
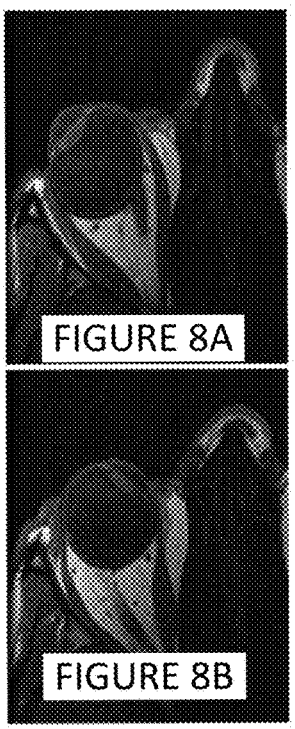
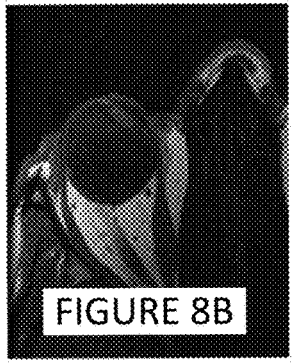
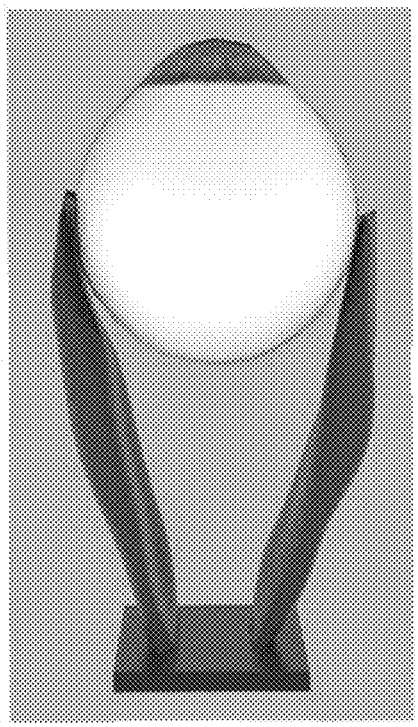
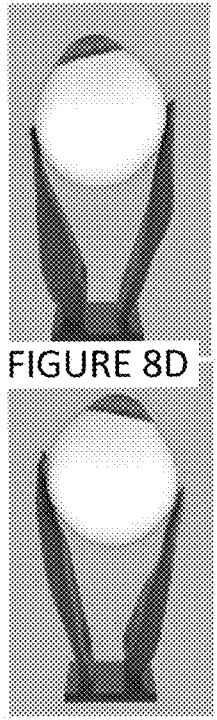
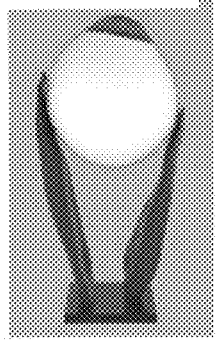
FIGURE 8A
FIGURE 8B
FIGURE 8C
FIGURE 8D
FIGURE 8E

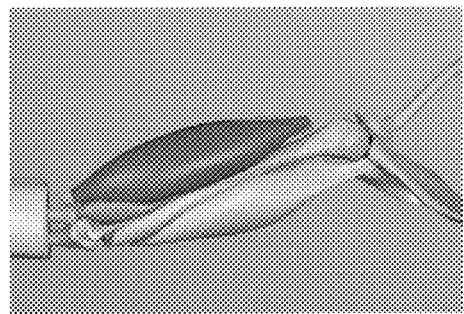 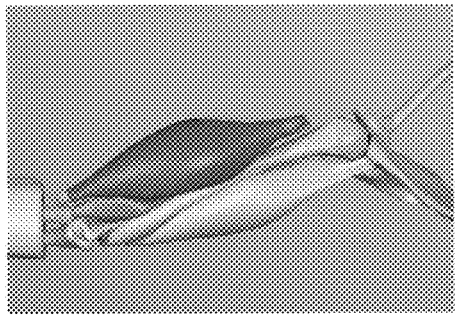
FIGURE 9A  FIGURE 9B
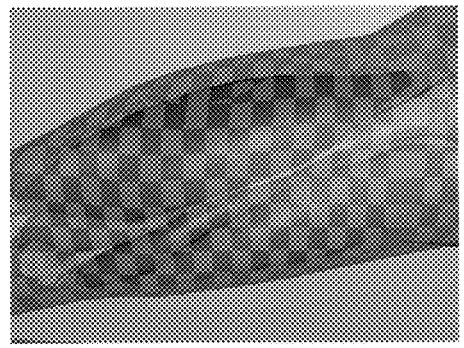 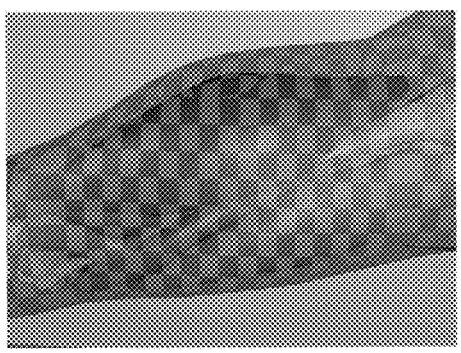
FIGURE 10A  FIGURE 10B

METHODS AND SYSTEMS FOR COMPUTER-BASED ANIMATION OF MUSCULOSKELETAL SYSTEMS

REFERENCE TO RELATED APPLICATIONS

This application claims priority from, and the benefit under 35 USC 119(e) of, U.S. patent application No. 62/101,977 filed on 9 Jan. 2015, which is hereby incorporated herein by reference.

TECHNICAL FIELD

The technology disclosed herein relates to computer-based graphics. Particular embodiments provide methods and systems for computer-based simulation of musculoskeletal systems and/or similar systems comprising a rigid-body (e.g. skeletal) system and a system of deformable, but volume preserving solids (e.g. soft tissue, such as muscle and fat), which interacts with the rigid-body system. Such simulations may be used to generate corresponding animations of the musculoskeletal systems and/or similar systems, which animations comprise ordered sequences of complete or partial digital image frames often referred to as Computer-Generated Imagery (CGI) video data, CGI animation data or CGI moving picture data.

BACKGROUND

Traditional (pre-digital) animation techniques involved one or more artists hand-drawing an ordered sequence of separate image frames which were rendered at a suitable frame rate to provide the illusion of movement. Early digital animation involved artists creating individual image frames in a digital environment to produce an ordered sequence of digital image frames. An advantage of these early digital animation processes is that elements of a digital image frame (such as a relatively static background scene, for example) could easily be copied onto other image frame(s), thereby speeding up the process of creating a sequence of digital image frames. Relatively recently, 2-dimensional and 3-dimensional computer-based graphic (CGI) simulations have been developed which use computer-based models to simulate the movement of objects as between digital image frames and to thereby provide data which can be used to animate moving objects within a sequence of digital image frames.

There is a desire to provide computer-based simulation and/or animation of musculoskeletal systems (and/or similar systems) comprising a rigid-body (e.g. skeletal) system and a system of deformable, but volume preserving solids (e.g. soft tissue, such as muscle and fat), which interacts with the rigid-body system. Such animation may simulate movement of the musculoskeletal system. Such simulations may be used to generate corresponding animations of the musculoskeletal systems and/or similar systems, which animations comprise ordered sequences of complete or partial digital image frames often referred to as Computer-Generated Imagery (CGI) video data, CGI animation data or CGI moving picture data. There is a general desire that such animations, when rendered by suitable computer-based graphics engines, provide musculoskeletal animation that appears realistic to viewers when rendered. There is a corresponding general desire to minimize the computation expense associated with performing such simulations and/or generating such animations.

One commercially available prior art musculoskeletal animation system is the Maya™ Muscle system provided by Autodesk Inc. As understood by the inventors, the Maya™ Muscle animation system is based on simplified physics equations to achieve dynamic muscle effects, as opposed to physics-based volumetric muscle simulation involving Finite Element Methods or Finite Volume Methods and does not include volume-preservation or close-contact constraints. As a consequence, animations generated using the Maya™ system can appear relatively un-realistic to viewers. Another prior art musculoskeletal animation system is described by Lee et al. in Comprehensive biomechanical modeling and simulation of the upper body. *ACM Transactions on Graphics (TOG)*, 28(4):99, 2009. As understood by the inventors, the Lee et al. system used a physics-based approach for modelling the shapes of muscles, but the Lee et al. model uses a muscle activation model using line segments to represent muscles and, consequently, can output soft tissue shapes that do not appear realistic when rendered. Another prior art musculoskeletal animation system is described by Teran et al. in Finite volume methods for the simulation of skeletal muscle. In *Proceedings of the 2003 ACM SIGGRAPH/Eurographics symposium on Computer animation*, pages 68-74, Eurographics Association, 2003. As understood by the inventors, the Teran et al. system incorporates a constitutive model which incorporates muscle fiber directionality. When muscles of the Teran et al. system are activated, they can exhibit relatively large forces in the direction of muscle fibers. However, such a model cannot be used to incorporate knowledge or desire of the muscle shape after activation and can still output soft tissue shapes that do not appear realistic. As understood by the inventors, none of these prior art animation systems allow users to specify input muscle shapes to which the soft-tissue model conforms.

Musculoskeletal systems comprise both relatively rigid tissue (e.g. skeletal bones) and relatively soft tissue (e.g. muscles and fat). While the musculoskeletal soft tissue is deformable, muscle and fat tissue exhibit volume preservation (within a typically normal range of pressure, temperature etc.). A prior art system for modeling soft solids in an Eulerian representation has been disclosed by Levin et al. in Eulerian solid simulation with contact, *ACM Transactions on Graphics (TOG)*, 30(4):36, 2011. The Levin et al. system simulates soft solids using an Eulerian representation which resists volume change by varying a Poisson ratio of the soft solid between 0 and 0.5. As the Poisson ratio approaches 0.5, the soft solid material becomes relatively more volume preserving. The Levin et al. system (and other numerical methods and systems for simulating soft solids based on the Poisson ratio) tend to suffer from the so-called "locking phenomenon" wherein the numerical techniques used in such simulations tend to break down.

There is a general desire for musculoskeletal simulation systems to avoid or mitigate interpenetration of the various objects in the system. Some prior art systems (such as the Lee et al. system discussed above) do not address this interpenetration issue and therefore can appear un-realistic when rendered. In some prior art systems (such as the Teran et al. system discussed above and in the system described by Blemker et al. in Fast 3D Muscle Simulations Using a New Quasistatic Invertible Finite-Element Algorithm, *International Symposium on Computer Simulation in Biomechanics* (2005)) use computationally expensive mesh-based collision detection algorithms to avoid interpenetration of objects within the musculoskeletal system. There is a general desire to avoid or mitigate interpenetration of the various objects in a musculoskeletal simulation system while avoiding or at least reducing the need for computationally expensive mesh-based collision detection algorithms.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for simulating a musculoskeletal system comprising a skeletal subsystem and a soft-tissue subsystem. The method comprises: maintaining, by a computer, a skeletal subsystem model representative of the skeletal system, the skeletal subsystem model comprising one or more rigid bodies and variables representative of shapes of the one or more rigid bodies in a physical space over a series of time steps; maintaining, by the computer, a soft-tissue subsystem model representative of the soft-tissue subsystem, the soft-tissue subsystem model comprising one or more deformable soft-tissue objects and, for each of the one or more soft-tissue objects, a representation of the soft-tissue object in an Eulerian space comprising a plurality of vertices, the soft-tissue object representation comprising an associated Eulerian representation for each vertex, the Eulerian representation specifying which one or more material space coordinates from among a set of material space coordinates for the soft-tissue object correspond to the vertex over the series of time steps; and coupling the skeletal system model and the soft-tissue subsystem model to one another using one or more coupling constraints, the one or more coupling constraints constraining available solutions to the skeletal subsystem model and the soft-tissue subsystem model over the series of time steps.

Another aspect of the invention provides a computer-implemented method for simulating a shape of a musculoskeletal system comprising a skeletal subsystem and a soft-tissue subsystem. The method comprises: saving, in a memory accessible to a computer system, a skeletal subsystem model comprising one or more rigid bodies and rigid body variables representative of shapes of the one or more rigid bodies in a physical space at at least one specific time; saving, in the memory accessible to the computer system, a soft-tissue subsystem model representative of the soft-tissue subsystem, the soft-tissue subsystem model comprising one or more deformable soft-tissue objects and, for each of the one or more soft-tissue objects, a soft-tissue object representation of the soft-tissue object in an Eulerian space comprising a plurality of vertices, the soft-tissue object representation comprising an associated Eulerian representation for each vertex, the Eulerian representation specifying which one or more material space coordinates from among a set of material space coordinates for the soft-tissue object correspond to the vertex at the at least one specific time; simulating, by the computer system, an evolution of the skeletal subsystem model over a series of time steps to thereby determine the rigid body variables representative of the shapes of the one or more rigid bodies in the physical space at each time step of the series of time steps; simulating, by the computer system, an evolution of the soft-tissue subsystem model over the series of time steps to thereby determine, for each of the one or more soft tissue objects, the soft-tissue object representation and the associated Eulerian representation for each vertex in the Eulerian space at each time step in the series of time steps, the associated Eulerian representation, for each vertex and for each time step in the series of time steps, specifying which one or more material space coordinates for the soft-tissue object correspond to the vertex at the time step; and saving, in the memory accessible to the computer system, the rigid body variables and the soft-tissue object representation for each of the one or more soft-tissue objects at each time step of the series of time steps. Simulating the evolution of the skeletal subsystem model and the soft-tissue subsystem model over the series of time steps comprise coupling the skeletal system model and the soft-tissue subsystem model to one another using one or more coupling constraints, the one or more coupling constraints constraining available solutions to the skeletal subsystem model and the soft-tissue subsystem model over the series of time steps.

The method may comprise: generating, by the computer system or a second computer system having access to the skeletal subsystem model and the soft-tissue subsystem model, an animation comprising, for each time step in the series of time steps, a corresponding digital image of at least a portion of a body incorporating the musculoskeletal system, wherein generating the animation is based at least in part on the skeletal subsystem model and the soft-tissue sub-system model; and saving the animation in a memory accessible to the computer system or the second computer system.

The one or more coupling constraints may constrain the rigid body variables representative of the shapes of the one or more rigid bodies in the physical space over the series of time steps based, at least in part, on the Eulerian representations of the soft-tissue object representations of the one or more soft-tissue objects over the series of time steps. The one or more coupling constraints may constrain the Eulerian representations of the soft-tissue object representations of the one or more soft-tissue objects over the series of time steps based, at least in part, on the rigid body variables representative of the shapes of the one or more rigid bodies in the physical space over the series of time steps.

Simulating the evolution of the soft-tissue subsystem model may comprise, for each of the one or more soft-tissue objects: determining, by the computer system, soft-tissue variables representative of a shape of the soft-tissue object in the physical space at each time step of the series of time steps and saving, in the memory accessible to the computer system, the soft-tissue variables at each time step in the series of time steps. The method may comprise: generating, by the computer system or a second computer system having access to the skeletal subsystem model and the soft-tissue subsystem model, an animation comprising, for each time step in the series of time steps, a corresponding digital image of at least a portion of a body incorporating the musculoskeletal system, wherein generating the animation may be based at least in part on the rigid body variables and the soft-tissue variables over the series of time steps; and saving the animation in a memory accessible to the computer system or the second computer system. Simulating the evolution of the skeletal subsystem model may comprise, for each rigid body, maintaining a representation of the rigid body in the Eulerian space, the rigid body representation specifying, for each vertex which one or more material space coordinates from among a set of material space coordinates for the rigid body correspond to the vertex. The rigid body representation in the Eulerian space may be constant over the series of time steps.

The method may comprise determining, by the computer system, a mapping, $\phi_1$, from the Eulerian space to physical space for each time step the series of time steps and saving, in the memory accessible to the computer system, the mapping, $\phi_1$, at each time step in the series of time steps. The mapping, $\phi_1$, from the Eulerian space to the physical space may comprise translation and rotation of the Eulerian space. The mapping, $\phi_1$, from the Eulerian space to the physical space may comprise deformation of the Eulerian space, wherein the deformation of the Eulerian space comprises relative movement between individual vertices of the Eulerian space. For each time step, determining the mapping, $\phi_1$, may be based, at least in part, on the rigid body variables representative of the shape of the one or more rigid bodies during the time step. The one or more coupling constraints may comprise, for each of the one or more soft-tissue objects, application of the mapping, $\phi_1$, to the soft-tissue object representation. The method may comprise: generating, by the computer system or a second computer system having access to the skeletal subsystem model and the soft-tissue subsystem model, an animation comprising, for each time step in the series of time steps, a corresponding digital image of at least a portion of a body incorporating the musculoskeletal system, wherein generating the animation is based at least in part on the rigid body variables and the mapping, $\phi_1$, over the series of time steps; and saving the animation in a memory accessible to the computer system or the second computer system.

Simulating the evolution of the skeletal subsystem model may comprise obtaining, as input, the rigid body variables representative of the shapes of the one or more rigid bodies in the physical space over the series of time steps. Simulating the evolution of the soft-tissue subsystem model may comprise, for each time step in the series of time steps, solving, by the computer system, a system of equations (including, possibly, inequalities) representing the dynamics of the soft-tissue subsystem subject to the one or more coupling constraints. Solving the system of equations representing the dynamics of the soft-tissue subsystem subject to the one or more coupling constraints may comprise solving, by the computer system, a quadratic programming problem representing the dynamics of the soft-tissue subsystem subject to the one or more coupling constraints. The method may comprise, for each of the one or more soft tissue objects: determining by the computer system, either soft-tissue variables representative of the shape of the soft-tissue object in the physical space for each time step in the series of time steps or and a mapping, $\phi_1$, from the Eulerian space to physical space for each time step the series of time steps based, at least in part, on the solution to either: the system of equations representing the dynamics of the soft-tissue subsystem or the quadratic programming problem representing the dynamics of the soft-tissue subsystem; and saving, in the memory accessible to the computer system, the soft-tissue variables or the mapping, $\phi_1$, at each time step in the series of time steps.

The one or more soft-tissue objects may comprise at least one activatable soft-tissue object and the method may comprise determining, by the computer system, an activation level $\alpha$ of the at least one activatable soft-tissue object for each time step in the series of time steps and saving, in the memory accessible to the computer system, the activation level $\alpha$ of the at least one activatable soft-tissue object at each time step in the series of time steps, the activation level $\alpha$ at each time step indicative of the constitutive properties of the activatable soft-tissue object. Determining the activation level $\alpha$ of the at least one activatable soft-tissue object for each time step in the series of time steps may comprise comparing: the input rigid body variables representative of the shapes of the one or more rigid bodies in the physical space over the series of time steps; and predicted shapes of the one or more rigid bodies in the physical space over the series of time steps, the predicted shapes predicted by a musculoskeletal model based, at least in part, on the activation level $\alpha$. The one or more soft-tissue objects may comprise at least one activatable soft-tissue object and the method may comprise determining, by the computer system, an activation level $\alpha$ of the at least one activatable soft-tissue object for each time step in the series of time steps and saving, in the memory accessible to the computer system, the activation level $\alpha$ of the at least one activatable soft-tissue object at each time step in the series of time steps, the activation level $\alpha$ at each time step indicative of a stress-free shape of the at least one activatable soft-tissue object.

Solving either the system of equations or the quadratic program problem may comprise permitting the musculoskeletal system simulation to reach an equilibrium state in each time step. Permitting the musculoskeletal system simulation to reach an equilibrium state in each time step may comprise minimizing an overall potential energy of the musculoskeletal system in each time step.

The method may comprise obtaining, as input, one or more external forces applied to the musculoskeletal system and formulating the system of equations representing the dynamics of the soft-tissue subsystem or formulating the quadratic programming problem representing the dynamics of the soft-tissue subsystem based, at least in part, on the one or more external forces.

The method may comprise: obtaining, as input, shapes of one or more external objects in the physical space over the series of time steps and constructing, by the computer system, contact constraints based on the shapes of one or more external objects in the physical space over the series of time steps and either: solving the system of equations representing the dynamics of the soft-tissue subsystem subject to the one or more coupling constraints may comprise solving the system of equations representing the dynamics of the soft-tissue subsystem subject to the one or more coupling constraints and the contact constraints; or solving the quadratic programming problem representing the dynamics of the soft-tissue subsystem subject to the one or more coupling constraints may comprise solving the quadratic programming problem representing the dynamics of the soft-tissue subsystem subject to the one or more coupling constraints and the contact constraints.

The one or more soft-tissue objects may comprise at least one activatable soft-tissue object and the method may comprise obtaining, as input, an activation level $\alpha$ for each time step in the series of time steps for the at least one activatable soft-tissue object, wherein for each time step, constitutive properties of the soft-tissue subsystem model for the at least one activatable soft-tissue object are based, at least in part, on the activation level $\alpha$. The elastic modulus of the activatable soft-tissue object may be correlated with the activation level.

Simulating the evolution of the soft-tissue subsystem model may comprise, for each time step in the series of time steps, solving, by the computer system, a system of equations (including, possibly, inequalities) representing the dynamics of the soft-tissue subsystem subject to the one or more coupling constraints, wherein, for each time step, the system of equations representing the dynamics of the soft-tissue subsystem is dependent on the activation level α of the at least one activatable soft-tissue object. Solving the system of equations representing the dynamics of the soft-tissue subsystem subject to the one or more coupling constraints may comprise solving, by the computer system, a quadratic programming problem representing the dynamics of the soft-tissue subsystem subject to the one or more coupling constraints, wherein, for each time step, the quadratic programming problem representing the dynamics of the soft-tissue subsystem is dependent on the activation level α of the at least one activatable soft-tissue object.

The method may comprise, for each of the one or more soft tissue objects: determining, by the computer system, soft-tissue variables representative of the shape of the soft-tissue object in the physical space for each time step in the series of time steps or a mapping, $\phi_1$, from the Eulerian space to physical space for each time step the series of time steps based, at least in part, on the solution to either: the system of equations representing the dynamics of the soft-tissue subsystem or the quadratic programming problem representing the dynamics of the soft-tissue subsystem; and saving, in the memory accessible to the computer system, the soft-tissue variables or the mapping, $\phi_1$, at each time step in the series of time steps.

Simulating the evolution of the skeletal subsystem model may comprise, for each time step in the series of time steps, solving, by the computer system, a system of equations (including, possibly, inequalities) representing the dynamics of the skeletal subsystem subject to the one or more coupling constraints. Solving the system of equations representing the dynamics of the skeletal subsystem subject to the one or more coupling constraints may comprise solving, by the computer system, a quadratic programming problem representing the dynamics of the skeletal subsystem subject to the one or more coupling constraints. The method may comprise, for each of the one or more rigid bodies, determining the, by the computer system, the rigid body variables representative of the shape of the rigid body in the physical space for each time step in the series of time steps based, at least in part, on the solution to either: the system of equations representing the dynamics of the skeletal subsystem or the quadratic programming problem representing the dynamics of the skeletal subsystem; and saving, in the memory accessible to the computer system, the rigid body variables at each time step in the series of time steps. The method may comprise obtaining, as input, one or more external forces applied to the musculoskeletal system and formulating the system of equations representing the dynamics of the skeletal subsystem or formulating the quadratic programming problem representing the dynamics of the skeletal subsystem based, at least in part, on the one or more external forces.

The method may comprise obtaining, as input, an isometric constraint which constrains the one or more rigid bodies to be static in the physical space over the series of time steps and wherein either: solving the system of equations representing the dynamics of the soft-tissue subsystem subject to the one or more coupling constraints comprises solving the system of equations representing the dynamics of the soft-tissue subsystem subject to the one or more coupling constraints and the isometric constraint; or solving the quadratic programming problem representing the dynamics of the soft-tissue subsystem subject to the one or more coupling constraints comprises solving the quadratic programming problem representing the dynamics of the soft-tissue subsystem subject to the one or more coupling constraints and the isometric constraint. The method may comprise for each of the one or more soft tissue objects, determining, by the computer system, soft-tissue variables representative of the shape of the soft-tissue object in the physical space for each time step in the series of time steps or a mapping, $\phi_1$, from the Eulerian space to physical space for each time step the series of time steps based, at least in part, on the solution to either: the system of equations representing the dynamics of the soft-tissue subsystem or the quadratic programming problem representing the dynamics of the soft-tissue subsystem; and saving, in the memory accessible to the computer system, the soft-tissue variables or the mapping, $\phi_1$, at each time step in the series of time steps.

The method may comprise obtaining, as input, the rigid body variables representative of the shapes of the one or more rigid bodies in the physical space for each time step in the series of time steps. The method may comprise, for each of the one or more soft tissue objects, determining, by the computer system, soft-tissue variables representative of the shape of the soft-tissue object in the physical space for each time step in the series of time steps or a mapping, $\phi_1$, from the Eulerian space to physical space for each time step the series of time steps based, at least in part, on the solution to either: the system of equations representing the dynamics of the soft-tissue subsystem or the quadratic programming problem representing the dynamics of the soft-tissue subsystem; and saving, in the memory accessible to the computer system, the soft-tissue variables or the mapping, $\phi_1$, at each time step in the series of time steps.

The one or more soft-tissue objects may comprise the activatable soft-tissue object and at least one passive soft-tissue object, the soft-tissue subsystem model corresponding to the passive soft tissue object having constitutive properties and a stress-free shape that are constant over the series of time steps.

The one or more soft-tissue objects may comprise at least one activatable soft-tissue object and wherein the method may comprise obtaining, as input, an activation level α for each time step in the series of time steps for the at least one activatable soft-tissue object, wherein, for each time step, a stress-free shape $\tilde{X}$ of the at least one activatable soft-tissue object depends on the activation level. For a given activation level α, the stress-free shape $\tilde{X}$ may be based, at least in part, on medical image data. The method may comprise, for a given activation level α, determining, by the computer system, the stress-free shape $\tilde{X}$ by interpolation, the interpolation based, at least in part, on the given activation level α and two or more activation level-muscle shape pairs which relate activation levels to corresponding stress-free shapes of the at least one activatable soft-tissue object, the corresponding stress-free shapes of the at least one activatable soft-tissue object based, at least in part, on medical image data.

For a given activation level α, the stress-free shape $\tilde{X}$ may be based, at least in part, on one or more human- or computer-generated artistic renderings of the corresponding stress-free shapes of the at least one activatable soft-tissue object. The method may comprise, for a given activation level α, determining, by the computer system, the stress-free shape $\tilde{X}$ by interpolation, the interpolation based, at least in part, on the given activation level α and two or more activation level-muscle shape pairs which relate activation levels to corresponding stress-free shapes of the at least one activatable soft-tissue object, the corresponding stress-free shapes of the at least one activatable soft-tissue object based, at least in part, on human- or computer-generated artistic renderings of the corresponding stress-free shapes of the at least one activatable soft-tissue object.

Simulating the evolution of the soft-tissue subsystem model may comprise, for each time step in the series of time steps, solving, by the computer system, a system of equations (including, possibly, inequalities) representing the dynamics of the soft-tissue subsystem subject to the one or more coupling constraints, wherein, for each time step, the system of equations representing the dynamics of the soft-tissue subsystem is dependent on the corresponding stress-free shape $\tilde{X}$ of the at least one activatable soft-tissue object. Solving the system of equations representing the dynamics of the soft-tissue subsystem subject to the one or more coupling constraints may comprise solving, by the computer system, a quadratic programming problem representing the dynamics of the soft-tissue subsystem subject to the one or more coupling constraints, wherein, for each time step, the quadratic programming problem representing the dynamics of the soft-tissue subsystem is dependent on the corresponding stress-free shape $\tilde{X}$ of the at least one activatable soft-tissue object. The method may comprise, for each of the one or more soft tissue objects: determining, by the computer system, soft tissue variables representative of the shape of the soft-tissue object in the physical space for each time step in the series of time steps or a mapping, $\phi_1$, from the Eulerian space to physical space for each time step the series of time steps based, at least in part, on the solution to either: the system of equations representing the dynamics of the soft-tissue subsystem or the quadratic programming problem representing the dynamics of the soft-tissue subsystem; and saving, in the memory accessible to the computer system, the soft-tissue variables or the mapping, $\phi_1$, at each time step in the series of time steps.

The coupling constraints may comprise one or more attachment constraints, each attachment constraint specifying a surface region of a corresponding soft-tissue object where a shape of the corresponding soft-tissue object in the physical space is constrained by the shape of one or more corresponding rigid-body objects in the physical space over the series of time steps. Each attachment constraint may comprise constraining a velocity of the Eulerian representation associated with the corresponding soft-tissue object on the surface region to be equal to a velocity which is a function of the shape of one or more corresponding rigid-body objects in the physical space over the series of time steps. For at least one of the one or more attachment constraints, the one or more corresponding rigid body objects may comprise a plurality of rigid body objects and the at least one of the one or more attachment constraints may comprise constraining the velocity of the Eulerian representation associated with the corresponding soft-tissue object on the surface region to be equal to a velocity which is a function of the shape of the plurality of corresponding rigid-body objects in the physical space and a moment arm between each pair of the plurality of corresponding rigid body objects over the series of time steps.

Simulating the evolution of the skeletal subsystem model and the soft-tissue subsystem model over the series of time steps may comprise constraining the soft-tissue subsystem model according to a volume-preservation constraint which tends to preserve the volume of one or more soft-tissue objects over the series of time steps, the volume preservation constraint constraining available solutions to the skeletal subsystem model and the soft-tissue subsystem model over the series of time steps. The volume-preservation constraint may comprise, for each soft-tissue object, constraining a rate of change of volume of the soft-tissue object with respect to time be zero for each time step in the series of time steps. The volume-preservation constraint may comprise, for each soft-tissue object, constraining a divergence of a velocity field associated with the soft-tissue object to be zero for each time step in the series of time steps, the velocity field associated with the soft-tissue object comprising the rate of change with respect to time of the associated Eulerian representation for each vertex.

The volume-preservation constraint may comprise, for each soft-tissue object, constraining a time integral of a rate of change of volume of the soft-tissue object with respect to time be zero for each time step in the series of time steps. The volume-preservation constraint may comprise, for each soft-tissue object, constraining a divergence of a velocity field associated with the soft-tissue object to be $$\frac{1}{dt}\frac{1-J_n}{J_n}$$

for each time step in the series of time steps, where $J_n$ is the determinant of a deformation gradient of the soft-tissue object at a time step n, dt is the time duration of the time step n and the velocity field associated with the soft-tissue object comprises the rate of change with respect to time of the associated Eulerian representation for each vertex.

The volume-preservation constraint may comprise, for each soft-tissue object, constraining a time integral of a rate of change of volume of the soft-tissue object with respect to time tend toward zero over the series of time steps. The volume-preservation constraint may comprise, for each soft-tissue object, constraining a divergence of a velocity field associated with the soft-tissue object to be $$\frac{\gamma}{dt}\frac{1-J_n}{J_n}$$

for each time step in the series of time steps, where $J_n$ is the determinant of a deformation gradient of the soft-tissue object at a time step n, dt is the time duration of the time step n, $\gamma$ is a damping factor and the velocity field associated with the soft-tissue object comprises the rate of change with respect to time of the associated Eulerian representation for each vertex.

Simulating the evolution of the skeletal subsystem model and the soft-tissue subsystem model over the series of time steps may comprise constraining the soft-tissue subsystem model according to one or more close-contact constraints, each close contact constraint between a pair of objects comprising a first soft-tissue object and a second object which is either a soft-tissue object or a rigid body object, each close contact constraint maintaining contact between portions of the corresponding pair of objects while permitting sliding movement between corresponding pair of objects. The method may comprise obtaining, as input, a close contact labelling, the close contact labeling identifying pairs of objects which may be subject to a close contact constraint. The method may comprise, for each pair of objects which may be subject to a close contact constraint: evaluating, by the computer system, an indicator function on the Eulerian vertices to determine whether there is a possibility of contact between the pair of objects; determining, by the computer system, that there is a possibility of contact between at least one pair of objects in a cell corresponding to at least one Eulerian vertex; subsampling, by the compute system, the indicator function in the at least one cell to identify whether there is a collision between the at least one pair of objects wherein the subsampled indicator function indicates that both of the at least one pair of objects are present; and determining, by the computer system, that there is a collision in the at least one cell and formulating, by the computer system, a close contact constraint between the at least one pair of objects and corresponding to the at least one cell.

For each close contact constraint where the second object is a soft-tissue object, the close contact constraint may comprise, for each Eulerian cell subject to the close contact constraint, constraining a dot product of a relative velocity between the pair of objects in the Eulerian cell and a representation of a surface normal for a portion of the Eulerian cell where the pair of objects are in contact to be zero. For each close contact constraint where the second object is a rigid-body object, the close contact constraint may comprise, for each Eulerian cell subject to the close contact constraint, constraining a dot product of a relative velocity between the pair of objects in the Eulerian cell and a representation of a surface normal for a portion of the Eulerian cell where the pair of objects are in contact to be constant in each time step, wherein the constant may be different in different time steps.

The skeletal subsystem model may comprise a plurality of body segments, each body segment comprising one or more rigid bodies and, for each rigid body, segment rigid body variables representative of shapes of the rigid body in a physical space for each time step in the series of time steps and each body segment comprising one or more deformable soft-tissue objects and, for each of the one or more soft-tissue objects, a representation of the soft-tissue object in an Eulerian space comprising a plurality of vertices, the soft-tissue object representation comprising an associated Eulerian representation for each vertex, the Eulerian representation specifying which one or more material space coordinates from among a set of material space coordinates for the soft-tissue object correspond to the vertex at each time step in the series of time steps. The method may comprise, for each body segment, determining, by the computer system, a mapping, $\phi\_1$, from the Eulerian space of the body segment to the physical space for each time step in the series of time steps. The mappings $\phi_1$, for the plurality of body segments may be piecewise continuous.

Other aspects of the invention provide a computer system comprising one or more processors, wherein the processors are configured to perform methods according to any aspects of the invention.

Other aspects of the invention comprise computer program products comprising computer-readable instructions embodied on non-transitory media. When executed by a suitable computer or processor, the computer-readable instructions cause the computer or processor to perform methods according to any aspects of the invention.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 7A and 7B respectively depict the application of an external force to a deformable object with and without volume preservation constraints.

FIGS. 8A and 8B show MRI data of a human eye. FIG. 8C shows the passive (non-activated configuration) of a simulation of a pair of eye muscles according to a particular embodiment. FIGS. 8D and 8E show physical space simulation results of the FIG. 8C eye muscles when activated in accordance with a particular embodiment.

FIGS. 9A and 9B respectively depict a simulation of the biceps and brachialis muscles without activation and with activation under isometric conditions according to a particular embodiment.

FIGS. 10A and 10B depict simulation results (e.g. portions of image frames in a simulation) for muscle wrapped in a deformable soft-tissue layer representative of fat and/or skin.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Particular embodiments of the invention provide systems and methods for computer-based simulation and/or animation of musculoskeletal systems (and/or similar systems) comprising a skeletal subsystem comprising rigid bodies (e.g. bones, joints and/or the like) and a coupled soft-tissue subsystem comprising deformable, but volume preserving, solids (e.g. muscles, fat, cartilage, skin and or the like), which interacts with the skeletal subsystem. Some stiff tissues such as ligaments and tendons may be modeled as either soft-tissues or rigid bodies. Such animation may simulate movement of the musculoskeletal system. Such simulations may be used to generate corresponding animations of the musculoskeletal systems and/or similar systems, which simulations comprise ordered sequences of complete or partial digital image frames often referred to as Computer-Generated Imagery (CGI) video data, CGI animation data or CGI moving picture data. Such animation may simulate movement of the musculoskeletal systems (and/or similar systems). In some embodiments, the soft tissue may be broken down into active soft tissue (e.g. muscles) and passive soft tissue (e.g. fat, cartilage, skin and/or the like). These soft-tissues are objects which may be represented in a computer-based simulation system by meshes (e.g. tetrahedral meshes or meshes of other polyhedral shapes) comprising vertices and, optionally, edges between vertices, surface faces and surface and/or volume elements (e.g. 2D polygonal surface elements and/or 3D polyhedral volume elements). As will be appreciated, the vertices and/or edges of any such meshes may comprise several values or several fields of values. Some embodiments of the invention make use of multiple values at each vertex of each mesh.

Simulation and/or animation of a musculoskeletal system may comprise modeling the evolution of the system (e.g. of the representations of the objects in the various subsystems) over time, in a discrete set of time steps, for example. As used in this disclosure, the phrase "time step" and similar expressions should be understood in a broad sense and should not be limited to time in a strict temporal sense. In some embodiments a time step may correspond to a step of simulation time, that is, of time within a simulation environment. In some embodiments, a time step may correspond to the frame rate of an animation. In some embodiments, a time step may correspond generally to a step in any numbered sequence (e.g., step 1, step 2, step 3, . . . ). Time steps may be, but need not be equal.

Figure 1:
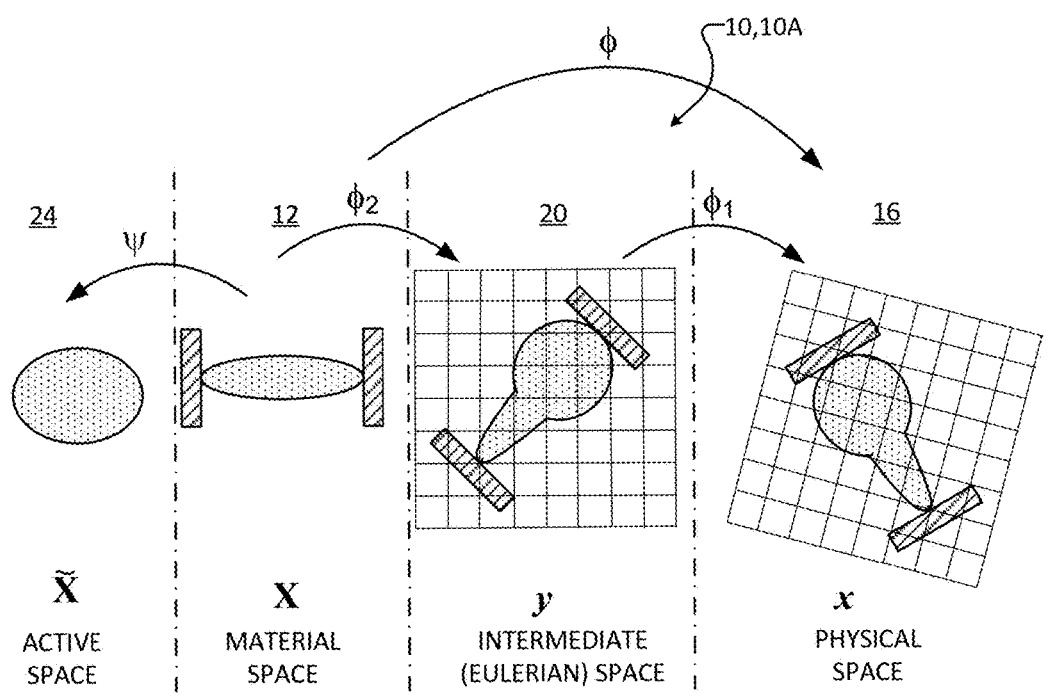
FIG. 1 is a schematic depiction of a number of spaces (the material space, the intermediate (Eulerian space), the physical space and the active space) which are used for simulation in accordance with some embodiments of the invention.

The simulation and/or animation methods described in the various embodiments of this disclosure are performed by computer systems comprising one or more suitably programmed processors. The simulation methods result in data, which may be used to generate CGI animation data (e.g. an ordered sequence of complete or partial image frames) which may in turn be rendered on one or more displays of the computer system, on one or more displays of other computer systems having access to the animation and/or for display on other displays having access to the animation. This disclosure defines a number of spaces or domains, which are depicted in FIG. 1. Methods according to some embodiments may comprise simulating of musculoskeletal systems which may comprise determining, maintaining and/ or otherwise simulating various parameters (e.g. values, variables, coordinates and/or the like and/or tools (e.g. transforms, mappings, Jacobian matrices and/or the like)) over a series of time steps to determine the parameters in the various FIG. 1 spaces over the series of time steps. Such parameters may be associated with various objects in the musculoskeletal systems and/or vertices corresponding to objects in the musculoskeletal systems. The simulation data (or evolution of such parameters over the series of time steps) may be determined from a set of known and/or given parameters (e.g. known or given values/coordinates) together with simulation model(s) of the various objects in the musculoskeletal systems. This simulation data may be maintained in a format, which is accessible to and usable by the computer system performing the simulation.

Eulerian Simulation Process

FIG. 1 schematically depicts a number of spaces used in a simulation model 10 according to a particular embodiment. The parameters of simulation model 10 may be maintained and updated by a suitably configured computer system. The FIG. 1 schematic illustration depicts the various spaces in two-dimensions for the purposes of illustration. In general, however, the spaces used in model 10 may be one-dimensional, two-dimensional, three-dimensional or any plurality of dimensions. Model 10 shown in FIG. 1 may be used to simulate a musculoskeletal system 10A which comprises a soft-tissue subsystem, which itself may comprise one or more soft-tissue objects (e.g. muscles, fat, cartilage, skin and/or the like) in musculoskeletal system 10A. Soft tissue objects may be of different types (e.g. muscle, fat, cartilage, skin and/or the like), each of which may have different constitutive properties (e.g. passive shape, deformability, etc.). A soft-tissue object is shown in the various FIG. 1 spaces in dotted hatching. Musculoskeletal system 10A simulated by the FIG. 1 model 10 also comprises a skeletal subsystem, which itself may comprise one or more rigid bodies (e.g. bones) and, optionally, other components (e.g. tendons, joints and/or the like) which may be used to formulate constraints, as explained in more detail below. A pair of rigid bodies in musculoskeletal system 10A is shown with angular hatching in the FIG. 1 illustration. Modelling of rigid-body systems (like the skeletal subsystem of musculoskeletal system 10A) is relatively well known. Accordingly, this description focuses on modeling the soft-tissue subsystem of musculoskeletal system 10A and how the skeletal and soft-tissue subsystems may be coupled to one another for modelling musculoskeletal system 10A.

The spaces in model 10 include a material space 12, where the vertices of the meshes corresponding to various objects in model 10 of musculoskeletal system 10A are represented in the abstract (e.g. in an un-deformed state with reference spatial positions). For example, where model 10 represents the musculoskeletal system 10A of an arm of a human, material space 12 may comprise mesh representations of the various muscles and other soft tissue of musculoskeletal system 10A in the abstract. The representations of objects in material space 12 may be static—i.e. objects in material space 12 do not evolve with time. In the illustrated FIG. 1 example, there is one soft-tissue object (shown in dotted hatching) which extends between a pair of rigid bodies (shown in angular hatching) in material space 12.

Model 10 may also comprise a physical space 16, where the vertices of the meshes corresponding to the various objects in musculoskeletal system 10A evolve over time to provide the simulation. That is model 10 may predict the evolution of objects in physical space 16 over a series of time steps—e.g. to provide the ordered sequence of images that make-up an animation. Continuing with the human arm example, the various structures of the arm in physical space 16 may evolve over time to show elbow flexion and corresponding contraction of the biceps. In the illustrated FIG. 1 example, the rigid bodies of musculoskeletal system 10A have translated and/or rotated in physical space 16 relative to their configuration in material space 12 and the soft-tissue object of musculoskeletal system 10A has contracted, rotated and translated in physical space 16 relative to its configuration in material space 12.

Model 10 of the illustrated embodiment also comprises an intermediate (Eulerian) space 20, where the Eulerian space 20 is discretized using a fixed set of vertices (shown as a grid in the two-dimensional example of FIG. 1). The vertices of the Eulerian grid in intermediate space 20 are fixed—i.e. do not evolve with time. However, vertices of the Eulerian grid in intermediate space 20 may be associated with corresponding points (e.g. vertices of the mesh) of objects in physical space 16 and with corresponding points (e.g. vertices of the mesh) of objects in material space 12. These associations may evolve with time. For example, as an object in musculoskeletal system 10A evolves over time in physical space 16, the material space points $\tilde{X}$ and physical space points x associated with each Eulerian vertex in intermediate space 20 will also evolve with time. FIG. 1 also shows that model 10 makes use of an active space 24 which is described in more detail below.

Following a common abuse of terminology, this disclosure uses similar variables to refer to the FIG. 1 spaces, objects in these spaces and points in these spaces. In particular this description uses: the variable X to refer to material space 12, objects in material space 12 and points (e.g. vertices) in material space 12; the variable x to refer to physical space 16, objects in physical space 16 and points (e.g. vertices) in physical space 16; the variable y to refer to intermediate space 20, objects in intermediate space 20 and points (e.g. vertices) in intermediate space 20; and the variable $\tilde{X}$ to refer to active space 24, objects in active space 24 and points (e.g. vertices) in active space 24. This disclosure may also make use of the notation q to refer to a stacked vector of configuration variables of interest—e.g. a vector formed by concatenating a number of the configuration variables of interest for model 10.

Methods according to particular embodiments comprise determining, for a musculoskeletal system 10A comprising a skeletal subsystem comprising one or more rigid-body objects and a soft-tissue subsystem comprising one or more soft-tissue objects, the evolution (e.g. over a series of time steps) of the physical space coordinates of various points (e.g. vertices) x associated with these objects or, equivalently, the time evolution of the mapping $\phi: X \to x$, which may be referred to as a deformation map (see FIG. 1). It will be appreciated that the time evolution of the deformation map $\phi$ defines the motion of any objects in musculoskeletal system 10A. Embodiments of the invention involve simulating the time evolution of solids and in particular the soft-tissue objects of the soft-tissue subsystem of musculoskeletal system 10A using Eulerian (and Eulerian-on-Lagrangian) discretization of solids. Eulerian (and Eulerian-on-Lagrangian) discretization of solids permits computationally efficient and robust simulation of large deformations, collision detection and simulation of pluralities of contacting soft-tissue objects on a single uniform (Eulerian grid) particularly when compared to prior art musculoskeletal simulation techniques based on Lagrangian simulation. A particular and non-limiting embodiment of an Eulerian-on-Lagrangian discretization model which may be used in some embodiments is described by Fan, Ye in Eulerian Finite Volume Method for Musculoskeletal Simulation and Data-driven Activation MSc thesis, University of British Columbia, available at www.circle.ubc.ca which is hereby incorporated herein by reference and which is referred to herein as the Fan Thesis. As shown in FIG. 1, in some embodiments, the deformation map $\phi$ may be broken down into an Eulerian component $\phi_2$ which maps the deformation of soft-tissue objects from material space 12 to their deformed state in intermediate space 20 due to Eulerian motion and a Lagrangian component $\phi_1$ which maps the deformed soft-tissue objects from intermediate space 20 into physical space 16 via Lagrangian motion, where $\phi = \phi_1 \circ \phi_2$. In some embodiments, the Lagrangian motion which maps the deformed soft-tissue objects from intermediate space 20 into physical space 16 may be dictated by the evolution of the coupled skeletal (rigid-body) subsystem of musculoskeletal system 10A.

In some embodiments, a musculoskeletal system 10A may comprise multiple body (e.g. limb) segments and the methods described herein may be implemented for each body segment of a musculoskeletal system 10A. Each body segment may in turn comprise a rigid-body subsystem comprising one or more rigid-body objects and a soft-tissue subsystem comprising one or more soft-tissue objects. The individual body segments of the musculoskeletal system may be joined together in a piecewise continuous manner. Practically, such embodiments involve piecewise continuous mappings $\phi_1$ (for each body segment) between intermediate space 20 and physical space 16, where each mapping $\phi_1$ (for each body segment) may be considered to be like rotational and/or translational motion of the Eulerian grid of intermediate space 20 without deformation of the Eulerian grid. This is not necessary, however; in some embodiments, the Eulerian grid of intermediate space 20 can itself be deformed as part of the mapping $\phi_1$ to conform to the shape of the overall musculoskeletal system 10A (or at least multiple body (e.g. limb) segments of musculoskeletal system 10A). For the purposes of simplifying explanation, the remainder of this description assumes, without loss of generality and unless the context dictates otherwise, that the portion of musculoskeletal system 10A being modeled is a body segment. Unless the context dictates otherwise, references to musculoskeletal system 10A should be understood to refer to a body segment of musculoskeletal system 10A wherein the body segment comprises a skeletal subsystem comprising one or more rigid bodies (e.g. bones) and a soft-tissue subsystem comprising one or more deformable solids (e.g. muscles), it being understood that other body segments of musculoskeletal system 10A could be similarly modeled.

In some embodiments, for the soft-tissue subsystem comprising one or more Eulerian solids (e.g. muscles), the inverse mapping $\phi_2^{-1}$ may be determined by advection to keep track of deformation of material space coordinates $\tilde{X}$ onto the Eulerian grid y of intermediate space 20—i.e. motion may be tracked using a discrete (vertex by vertex) representation of the inverse mapping $\phi_2^{-1}$. This mapping $\phi_2^{-1}$ may be understood to represent, for each occupied vertex y of the Eulerian grid in intermediate space 20, a mapping which describes material space coordinates X—i.e. which part (e.g. vertex or vertices) of an object from material space 12 is located in the cell corresponding to the occupied vertex y of the Eulerian grid. This mapping $\phi_2^{-1}$ may then be used to determine a deformation gradient F of the soft-tissue solids and ultimately the elastic forces within the soft-tissue solid. This approach is described in the Fan Thesis and also in Levin et al., Eulerian Solid Simulation with Contact, 2011 *ACM Transactions on Graphics (TOG)* 30, 4, 36, which is hereby incorporated herein by reference and which is referred to herein as Levin et al. (2011). A benefit of the Eulerian discretization of solids (over the more traditional Lagrangian discretization) is the ability to handle large deformations of relatively soft materials in an "output sensitive" manner (i.e. using a grid that depends on the desired output animation) without the requirement for re-meshing, which tends to be extremely computationally expensive.

For soft-tissue objects that share the same Eulerian grid (e.g. the heads of the biceps in FIG. 4), another benefit of the Eulerian discretization (over more traditional Lagrangian discretization) is the ability to detect and resolve collisions between multiple objects that share the same Eulerian grid in intermediate (Eulerian) space 20—without the need to perform mesh-based collision detection involving the use of one or more data structures separate from the data structures (e.g. meshes) corresponding to the objects themselves, as is the case with prior art Lagrangian simulation techniques. Model 10 may define, for each object in musculoskeletal system 10A, an indicator function $I(\phi^{-1}(x))$ which identifies whether the object occupies physical space coordinate x—e.g. returning I=1 if the object occupies physical space coordinate x and I=0 if the object does not occupy physical space coordinate x. With an Eulerian discretization, such an indicator function may be defined as $I(\phi^{-1}(x))=I(\phi_2^{-1}(\phi_1^{-1}(x)))=I(\phi_2^{-1}(y))$ for each object on the Eulerian grid of intermediate space 20, which returns one value (e.g. I=0) if the corresponding material space position X (or $\phi_2^{-1}(y)$) is outside of the object boundary and returns a different value (e.g. a value different from I=0) if the corresponding material space position X (or $\phi_2^{-1}(y)$) is inside or within one discretization interval of a boundary of the object. Model 10 may use these indicator functions to estimate contact constraint normals g, which may then be assembled into close contact and external contact constraint matrices $G_{CC}$ and $G_C$ as described in more detail below.

In some embodiments, for objects in intermittent contact, after representing accelerations in terms of velocity $v^{n+1}$, at time step $t_{n+1}$ and velocities at one or more other time steps and using the Gaussian principle of least constraints, the dynamics of a deformable object (e.g. a muscle) in a soft-tissue sub-system subject to contact constraints reduces to the solution of a convex quadratic program (QP) problem given by:

$$v^{n+1} = \operatorname*{argmin}_{v} \frac{1}{2} v^T M v - v^T f^* \quad (1a)$$

subject to $Gv \le b$ where v is the velocity on the Eulerian grid vertices y, M is a generalized mass matrix, and $f^*$ is a generalized impulse (e.g. due to advection and various internal and/or external forces). The derivation of equation (1a) for the case of particular constraint matrices ($G_V$, $G_C$, $G_A$) and for a particular exemplary impulse $p_B$ is described in the Fan Thesis) and is described in more detail below.

The Fan Thesis also describes how bones and tendons (i.e. the rigid-body subsystem) of musculoskeletal system 10A may be simulated by model 10 by treating bones as rigid bodies, joints as constraints on the relative motion between bones and tendons as inextensible connections between muscles and bones which provide corresponding attachment constraints. Again, the Gaussian principle of least constraints may be used to derive a quadratic program (QP) problem, which may be used to model bones and tendons according to a particular embodiment:

$$\dot{q}^{n+1} = \operatorname*{argmin}_{\dot{q}} \frac{1}{2} \dot{q}^T M_S \dot{q} - \dot{q}^T (p_S^n + p_A^n) \quad (1b)$$

subject to $G_S \dot{q} \le d$ where: $\dot{q}$ is a configuration variable vector corresponding to $\dot{q}=(\dot{x},\dot{y},\dot{z},\dot{\alpha},\dot{\beta},\dot{\gamma})$, where $(\dot{x},\dot{y},\dot{z})$ represent linear translational velocities, and $(\dot{\alpha},\dot{\beta},\dot{\gamma})$ represent angular velocities; $M_S$ is the skeletal inertia tensor; $p_S$ is the external impulse; $p_A$ is the coupling impulse resulting from the attachment constraints between the skeletal subsystem and the soft-tissue subsystem (e.g. associated with tendons); and $G_S$ is a matrix which may include equality and/or inequality constraints which constrain the motion of bones due to corresponding joints. Details of techniques used to provide constraints for various types of joints are described in Cline, Michel Bradley, *Rigid Body Simulation with Contact and Constraints*, MSc thesis, University of British Columbia, available at www.circle.ubc.ca, which is hereby incorporated herein by reference.

These QP problems and techniques for solving these QP problems according to particular embodiments are described in more detail below.

Muscle Activation

When an active muscle contracts, there is an internal reorganization of its mass mediated by molecular motors, which cause myofilaments to slide relative to each other. The actual dynamics of active muscle is complex and not very well understood. Further, there are significant differences between the properties of different muscles and between individuals. Simulation methods according to particular embodiments may incorporate a model corresponding to muscle activation, which is practical for computer-based implementation, but is as realistic as practicable. Simulation methods according to particular embodiments may incorporate a model corresponding to muscle activation, which represents a change to the material space configuration of a muscle. In some embodiments, muscle activation is represented by a variable α over a suitable range—e.g. $\alpha \in [0,1]$, where 0 represents no activation and 1 represents maximum activation. Referring to FIG. 1, material space 12 without any activation (i.e. α=0) may be referred to as the passive space and material space with non-zero activation may be referred to as active space 24. Points (vertices) in active space 24 may be referred to using the variable $\tilde{X}$, where the active space coordinates $\tilde{X}$ are functions of an activation level $\alpha_n$ at a time step $t_n$. The mapping between passive space 12 and active space 24 (i.e. between X and $\tilde{X}$) may be defined as ψ, such that, for a given activation level $\alpha_n$ at a time step $t_n$, the chain of mappings from physical space 16 to active space 24 may be defined as:

$$\tilde{X}=\psi(\phi^{-1}(x)) \quad (2)$$

For a given activation level α, active space 24 and its vertices $\tilde{X}$ represent the stress-free shape of muscles—i.e. the shape of muscles without any internal stress or force. In the absence of activation, the elastic deformation gradient $$F = \frac{\partial x}{\partial X}$$

is the local measure of object deformation. However, where the muscle is activated and has an active stress-free shape given by $\tilde{X}$, the elastic deformation gradient $\tilde{F}$ is given by:

$$\tilde{F} = \frac{\partial x}{\partial \tilde{X}} = \frac{\partial x}{\partial \psi(\phi^{-1}(x))} = \left(\frac{\partial \psi(\phi^{-1}(x))}{\partial x}\right)^{-1} \quad (3)$$

It should be noted here that X and $\tilde{X}$ do not need to have the same discretization as the simulation mesh x in physical space 16, as long as the various mappings between spaces are well defined. Specifically, in some embodiments, for a particular point x, it is sufficient that a corresponding position in $\tilde{X}$ can be found through the various mappings. This ability to use different discretizations permits some embodiments to use a relatively high resolution discretization for the active configuration space 24 regardless of the simulation mesh y in Eulerian space 20.

Each activation level in $\alpha \in [0,1]$ may correspond to a different muscle shape in active space 24. In some embodiments, shapes corresponding to a plurality of activation levels may be determined or otherwise obtained (e.g. as input) using any suitable technique. Non-limiting examples of how such shapes may be obtained include medical imaging technology, such as magnetic resonant imaging (MRI), tomography, ultrasound and/or the like. These muscle shape and activation level pairs provide an indication of real muscle behavior. Obtaining muscle shapes for various activation levels is not limited to medical imaging technology. In some embodiments, artists renderings or other techniques may be use to freely design shapes corresponding to a plurality of activation levels with a one-to-one correspondence between shapes and activation levels.

Once muscle shapes are obtained for a plurality of activation levels, the active muscle shape $\tilde{X}(\alpha_n)$ for any general activation level c at a time step $t_n$ may be obtained by interpolation or other suitable modeling function. Since many muscles are shortened and/or extended with only a small amount of rotation, some embodiments may use linear interpolation. For example, where $\tilde{X}(\alpha=1)=\tilde{X}(1)$ is a muscle shape corresponding to maximum activation (i.e. $\alpha=1$) and $\tilde{X}(\alpha=0)=\tilde{X}(0)=X$ is a passive muscle shape corresponding to no activation (i.e. $\alpha=0$), then, in some embodiments, the active muscle shape $\tilde{X}(\alpha_2)$ for any general activation level $\alpha_n$ at a time step $t_n$ may be given by the linear interpolation $\tilde{X}(\alpha_n)=\tilde{X}(0)+\alpha_n(\tilde{X}(1)-\tilde{X}(0))=X+\alpha_n(\tilde{X}(1)-X)$. In some embodiments, a linear interpolation can be used to estimate the active muscle shape $\tilde{X}(\alpha_n)$ for any general activation level c at a time step $t_n$ using references other than $\tilde{X}(1)$ and $\tilde{X}(0)=X$. For example, a linear interpolation estimate of the active muscle shape $\tilde{X}(\alpha_n)$ for any general activation level c at a time step $t_n$ may involve the use of any two or more activation level-muscle shapes pairs (e.g. $(\alpha_A, \tilde{X}(\alpha_A))$ and $(\alpha_B, \tilde{X}(\alpha_B))$). In some embodiments, the active muscle shape $\tilde{X}(\alpha_n)$ for any general activation level $\alpha_n$ at a time step $t_n$ may be given by some more general function $\mathcal{G}$, where $\mathcal{G}$ is a function of one or more of $\alpha_n$ and two or more activation level-muscle shapes pairs (e.g. $(\alpha_A, \tilde{X}(\alpha_A))$ and $(\alpha_B, \tilde{X}(\alpha_B))$)—e.g. $\tilde{X}(\alpha_n)=\mathcal{G}(\alpha_n, \tilde{X}(\alpha_A), \tilde{X}(\alpha_B))$. The function $\mathcal{G}$ may be a continuous, smooth, function that avoids sudden discontinuities. In some embodiments, the active muscle shape $\tilde{X}(\alpha_n)$ for any general activation level c at a time step $t_n$ may be given by some other muscle activation model based on the activation level $\alpha_n$ at a time step $t_n$. In some embodiments, such interpolation and/or modeling may not be necessary, as muscle shapes $\tilde{X}$ may be obtained for a sufficient number of discrete activation levels $\alpha$ to use these muscle shapes $\tilde{X}$ directly. In some embodiments, where muscles rotate significantly during activation, this rotation may be handled by the standard approach of factoring out rotation and interpolating the remainder, similar to the approach used in co-rotational elasticity.

Applying the chain rule to equation (3) above reveals that $$\tilde{F} = \frac{\partial x}{\partial X} = \frac{\partial x}{\partial \tilde{X}} \frac{\partial \tilde{X}}{\partial X} \quad (4)$$

Equation (4) suggests a multiplicative decomposition property, wherein the term $$\frac{\partial x}{\partial X}$$

may be interpreted to be the total deformation gradient between material space 12 and physical space 16 and wherein the term $$\frac{\partial x}{\partial \tilde{X}}$$

may be interpreted to be the inverse plastic deformation gradient, which evolves over time.

Figure 2A:
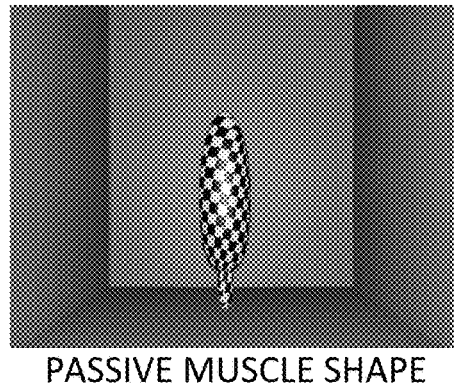
FIGS. 2A-2D (collectively, FIG. 2) show a number of exemplary user designed muscle shapes which illustrate the activation model which may be used for simulation and/or animation in some embodiments.
Figure 2B:
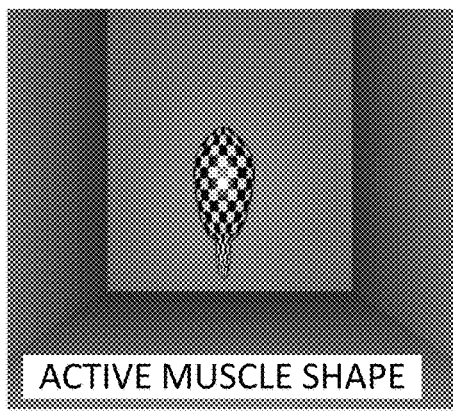
Figure 2C:
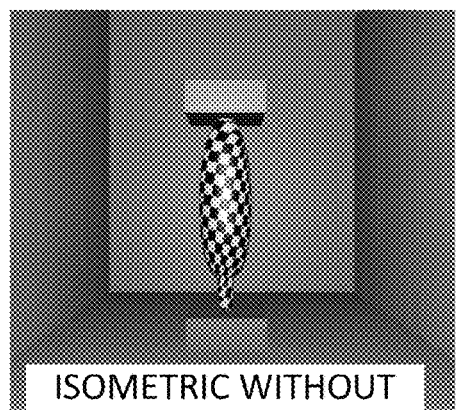
Figure 2D:
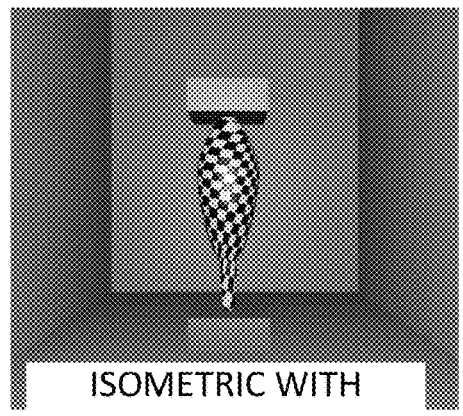

FIGS. 2A-2D (collectively, FIG. 2) show a number of exemplary user designed muscle shapes which illustrate the activation model which may be used in some embodiments. In particular, FIG. 2A shows an example passive muscle shape (i.e. where $\alpha=0$), which may represent the shape of a muscle in material space 12. FIG. 2B shows an example of an active muscle shape at some activation level $\alpha$, where $0<\alpha\leq 1$. FIGS. 2C and 2D show the muscle of FIGS. 2A and 2B with constraints at its endpoints to simulate isometric muscle contraction (i.e. where the endpoints of the muscle do not move). FIG. 2C shows the muscle under isometric constraints without activation (i.e. where $\alpha=0$) and FIG. 2D shows the muscle under isometric constraints at the same activation level $\alpha$ as FIG. 2B, where $0<\alpha\leq 1$. Under these isometric activation conditions, comparing FIGS. 2C and 2D shows how the muscle moves realistically toward the origin of the muscle (the upper end in the FIG. 2 views) while stretching elastically to meet the isometric endpoint constraints. Simulations and corresponding animations using this activation level model may, when rendered, provide more realistic looking CGI animation when compared to prior art musculoskeletal simulation systems using muscle activation models.

In addition or in the alternative to the activation level $\alpha$ changing the reference shape of a corresponding muscle, some embodiments may comprise changing the constitutive properties of the material that forms a muscle object based on the activation level. For example, the stiffness of a muscle object's material may increase with increased activation level $\alpha$. Additionally or alternatively, in some embodiments, the activation level $\alpha$ may be used as a basis for changing the strain corresponding to a muscle material's zero-stress configuration. For example, a constitutive model may relate the stress $\sigma$ to the strain c measured in an unactivated (passive) state of the material, by $\sigma=C(\varepsilon)$. In activated muscle, the muscle's stress may be given, for example, by $\sigma=C(\varepsilon-\varepsilon_0(\alpha))$. Here $\varepsilon_0(\alpha)$ is the rest strain, whose value is 0 when $\alpha=0$ but may be non-zero for other values of $\alpha$.

An advantage of the activation models described herein is that they can utilize data measured from the tissues of specific individuals using medical imaging techniques or other means, or from artist-designed muscle shapes. By contrast, the prior art, for instance the above-discussed musculoskeletal simulation disclosed by Teran et al., utilizes theoretical model parameters and knowledge of the distribution of muscle fiber directions within a muscle. Such model parameters are difficult to obtain for a specific individual.

Volume Preservation

Muscles, like most biological tissues, comprise mostly water and, therefore, are nearly incompressible. Preserving volume in muscle simulation is desirable for capturing visual effects, such as bulging and the classical "squash and stretch" of muscle tissue. Prior art deformable solid simulation techniques, like Levin et al. (2011), typically approximate resistance to volume change by tuning constitutive properties of the solid (specifically, adjusting the Poisson's ratio). This is effective for some soft solid objects, but as Poisson's ratio approaches 0.5, such approximations produce a numerical computation difficulty known as the "locking phenomenon".

In some embodiments, simulation of musculoskeletal system 10A involves directly treating volume preservation as a constraint to be satisfied along with the system dynamics Some embodiments comprise introducing a stabilization term that reduces drift from the constant volume constraint. The determinant J of the deformation gradient $$F = \frac{\partial x}{\partial X}$$

defines a volume change according to:

$$dv = JdV \quad (5)$$

where dv is a change in volume in physical space 16 and dV is a change in volume in material space 12. A volume conservation constraint may be imposed by requiring that volume in material space 12 is equal to the volume in physical space 16—i.e. dV=dv. By the definition of J, we require J=1. This constraint appears simple, but is non-linear. In some embodiments, rather than imposing this non-linear constraint, simulation of muscle deformation may involve taking the time derivative of both sides of J=1, and enforcing the constraint j=0. The physical interpretation of this constraint is that the rate of volume change is zero at every time step. That is:

$$j = J\nabla \cdot v = 0 \quad (6)$$

If J≠0 (i.e. the corresponding finite element is not flattened), equation (6) shows that the constraint j=0 is equivalent to enforcing a divergence-free velocity field (i.e. ∇·v=0). In some fluid animation techniques, the constraint ∇·v=0 is commonly solved by a pressure projection step. In practice, this constraint doesn't track positional variables (e.g. X or $\phi_2^{-1}$). Consequently, accumulated numerical drift may cause significant and undesirable volume change. To combat such drift, some methods for musculoskeletal simulation according to particular embodiments of the invention make use of a stabilization technique that enforces the time integral of j to be zero:

$$0 = \int_0^{t_{n+1}} j = \int_0^{t_n} j + \int_{t_n}^{t_{n+1}} j = J_n - 1 + \int_{t_n}^{t_{n+1}} J\nabla \cdot v \quad (7)$$

where: $t_n$ is the time at the current time step, $t_{n+1}$ is the next time step, $J_n$ is the determinant of the deformation gradient at the current time step and it is assumed that $J_0=1$. $J_n$ may be determined in a straightforward manner based on X (or, equivalently, $\phi_2^{-1}$). In some embodiments, the integral $\int_{t_n}^{t_{n+1}} J\nabla \cdot v$ may be numerically integrated using a first order approximation that is explicit in the position variable J and implicit in the velocity v:

$$\int_{t_n}^{t_{n+1}} J\nabla \cdot v = dt J_n \nabla \cdot v_{n+1} \quad (8)$$

Substituting equation (8) back into equation (7) results in:

$$\nabla \cdot v_{n+1} = \frac{1}{dt} \frac{1 - J_n}{J_n} \quad (9)$$

The equation (9) constraint can be interpreted as a Newton-like step that attempts to zero the error in J in one step. This may be more aggressive than necessary, and lead to large velocity changes when using small time steps. As with Newton's method, some embodiments may involve the use of a damped volume preservation step:

$$\nabla \cdot v_{n+1} = \frac{\gamma}{dt} \frac{1 - J_n}{J_n} \quad (10)$$

using a damping factor γ∈(0,1] that controls how rapidly the volume error is reduced. This damping factor γ may be configured to balance volume-preservation with other constraints.

The volume preservation description presented above, discusses volume preservation in terms of material space 12, which corresponds to muscle in a passive state (i.e. where the activation α=0). Those skilled in the art will appreciate that the volume preservation description and techniques presented above could be extended to active space 24 by formulating these concepts in terms of the deformation gradient $$\tilde{F} = \frac{\partial x}{\partial \tilde{X}}$$

discussed above in connection with muscle activation. Some simulation embodiments comprise using muscle activation and volume preservation concepts.

As described in the Fan Thesis, the volume preservation constraint of equation (9) may be discretized to have a form $$\sum_{i,j} T_{ij}(v) = \frac{1 - J_n}{dt J_n} V$$

and/or the volume preservation constraint of equation (10) may be discretized to have a form $$\sum_{i,j} T_{ij}(v) = \frac{1 - J_n}{dt J_n} \gamma V.$$

Figure 6:
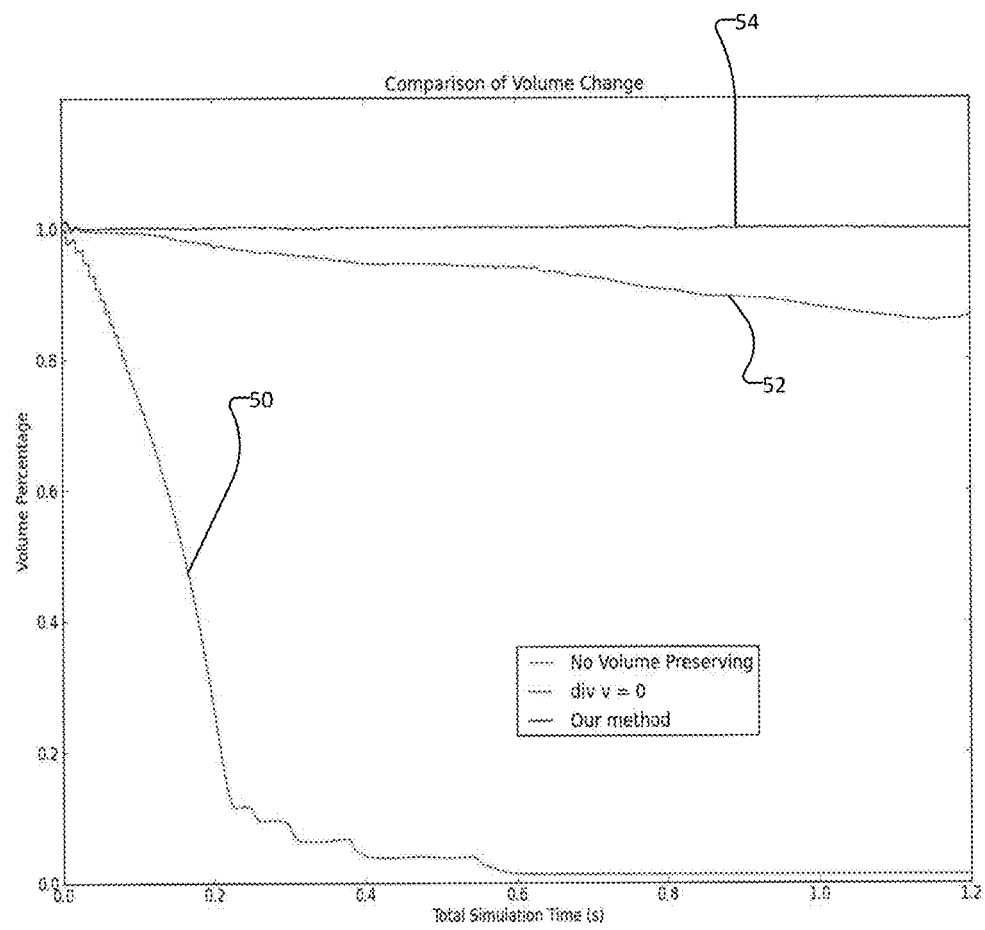
FIG. 6 is a plot showing volume change over time for various applications of volume preservation constraints to the example deformable object of FIG. 5.

The constraints having this form can then be assembled into a volume preservation constraint matrix of the form $G_V v = c$. One advantage of this approach for handling volume preservation (i.e. implementing a volume preservation constraint for a musculoskeletal system simulation) relative to prior art techniques is that this approach addresses volume drift well over a duration because it corrects volume drift at each time step. This advantage is shown in FIG. 6 and is described in more detail below. Another advantage of this approach for handling volume preservation relative to prior art techniques is that this approach is incorporated into the dynamics problem and does not require an additional computation step imposed after solving the system dynamics. As a result, the above-described formulation of the volume preservation constraint is more computationally efficient than the prior art.

External Contact

As described in the Fan Thesis, simulation methods according to various embodiments may simulate contact of any objects of musculoskeletal system 10A with other objects being modelled and/or with external objects and such contact may be formulated to have a constraint matrix of the form $G_C v \le r$. In some embodiments, pairs of objects may be flagged as having a potential for contact and then such contact may be evaluated according to the techniques described in the Fan Thesis. External contact between objects being modelled or between objects being modelled and external objects may change generally over time—e.g. objects may come into external contact with one another and may move away from one another over time. The concept of external contact is used herein only to distinguish between general (external) contact and close contact (described in more detail below) and external contact should be understood to mean contact generally and not be expressly limited to contact with external objects.

Close Contact

In some embodiments, simulation of musculoskeletal system 10A involves modeling the interactions between adjacent muscles and/or adjacent muscles and bones. Biological tissues are often packed closely together in the body and held together by collagenous connective tissues which allow muscles to slide relative to each other and/or relative to bones. While there may be some force transmission between adjacent synergistic muscles and/or bones along their lengths, such force transmission is typically small in the physiological range. In some embodiments, some muscles that are typically thought of as single muscles, such as the biceps and triceps muscles of the arm or other groups of muscles in close contact, may be modeled as multiple muscles in close contact, with relative sliding therebetween. The heads ("-ceps") of such muscles in close contact may have different origins and their mechanical actions may vary based on joint angles. Detecting and responding to close contact between deformable objects over large surface areas is a significant challenge using standard contact processing methods originally developed for sparse and intermittent contact between rigid bodies. In some embodiments, these challenges of appropriate modeling and efficient computation of muscles in close contact may be addressed by modeling muscles in close contact separately from intermittent external contact.

In some embodiments, close contact constraints are developed for each cell of the Eulerian grid of intermediate space 20. In some embodiments, before simulation, pluralities of objects may be identified (e.g. by suitable input based on prior knowledge of the system to be simulated) as being potentially in close contact. For example, for biological tissues, this prior knowledge may be available from anatomical properties of objects in consideration, from medical imaging, from observation and/or the like. For example, it is known from basic human anatomy that the long and short heads of the biceps are always in contact, so this pair of objects is a good candidate for identification as being potentially in close contact.

As part of the simulation (e.g. in each time step), objects identified as potentially being in close contact may be evaluated to detect collisions between portions of the object and, where such collisions are detected, to formulate corresponding close contact constraints. Because the simulation framework of the various embodiments of the present invention involves Eulerian simulation, voxel based collision detection is relatively straightforward (see the above description of the indicator function) and avoids the computationally expensive mesh-based collision detection of prior art Langrangian simulation techniques. In some embodiments, it may be desirable to consider collision detection with sub-cell precision (i.e. with a precision finer than the Eulerian grid of intermediate space 20), in which case each Eulerian cell may be subsampled to find sub-cells occupied by more than one object. If any sub-cell is occupied by two or more objects, then the two or more objects may be tagged as being in close contact in the corresponding Eulerian cell. For each Eulerian cell where two or more objects are tagged as being in close contact, a corresponding close contact constraint may be formulated for each pair of objects tagged as being in close contact in that Eulerian cell—i.e. one close contact constraint per each pair of close contact objects per each Eulerian cell. In some embodiments, the search for collisions between portions of objects and the formulation of corresponding close contact constraints may be performed at each time step of the simulation. In some embodiments, close contact constraints may be formulated on a sub-Eulerian cell basis (e.g. on the same sub-cells used for collision detection).

Figure 3:
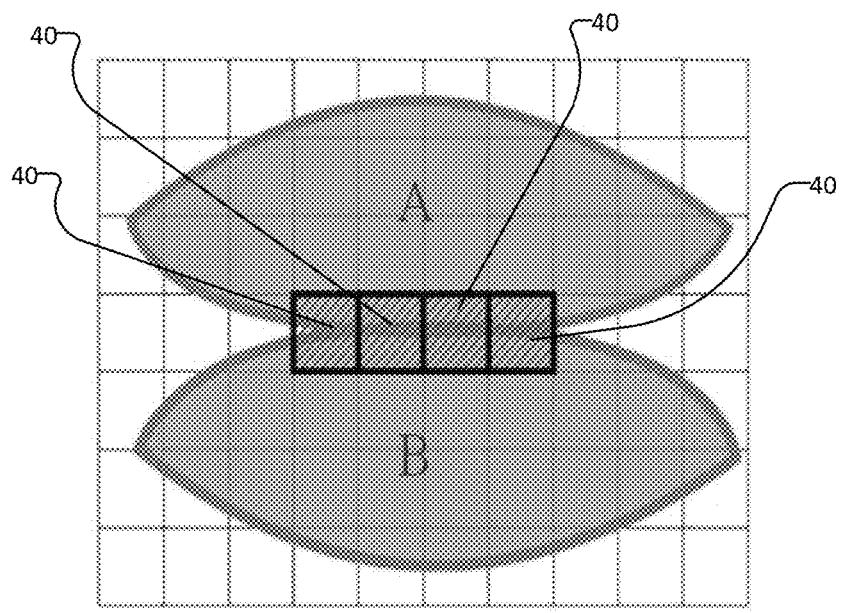
FIG. 3 is a schematic depiction of a pair of objects in close contact with one another and a collision detection process associated with selecting a particular set of Eulerian cells for establishing close contact constraints in accordance with some embodiments.

FIG. 3 shows an example of how the Eulerian grid may be used to detect collisions between objects and to identify the Eulerian cells for which close contact constraints may be developed. FIG. 3 shows a pair of objects A and B and identifies four cells 40 (shown in bold outline) where the objects A and B are in close contact (i.e. where there is a collision between portions of object A and object B). A close contact constraint may be developed for each of these four identified cells. In some embodiments, each constraint between a pair of objects in close contact may have the form:

$$v^{rel} \cdot \hat{n} = 0 \qquad (11)$$

where $v^{rel} = v_\Gamma^A - v_\Gamma^B$, $\Gamma$ is the contact surface and g is the contact normal.

The physical meaning of equation (11) is that the projections of the velocities of the two objects at the contact surface $\Gamma$ onto the surface normal direction is the same. This equation (11) constraint is similar to the constraints used for external contact (which are incorporated into the general constraint matrix G of equation (1a)), except that the inequality of the external contact constraints equation (1a) is replaced with an equality constraint in equation (11). The use of an equality for the equation (11) close contact constraints (as compared to the inequality used for external contact constraints) involves making the assumption that, for the portion of an Eulerian cell where the objects are in close contact, the pair of objects must remain in close contact and are not permitted to separate from one another. This assumption may be thought of as permitting the objects to be fixed and/or permitting relative "sliding" motion between the objects over the portion of the cell where the objects are in close contact. The assumption that relative motion between the pair of objects in close contact is fixed and/or sliding has at least two associated advantages. First, this assumption significantly improves the computational efficiency of the solver. In particular, the equality in the equation (11) constraints leads to the conclusion that all close contact constraints are active, thereby eliminating the need to evaluate whether the particular constraints are active (part of the active-set method for solving QP problems). In the absence of other inequality constraints, the QP problem associated with simulating the soft-tissue (discussed in more detail below) is reduced to solving a linear system. It should be noted that inequality constraints (and solving a corresponding Linear Complimentary Problem (LCP)) may still be used to model external (intermittent) contact and/or other constraints. Second, the assumption that relative motion between the pair of objects in close contact is fixed and/or sliding eliminates the need for simulating the connective tissue which prevents muscles from separating.

The variable $\Gamma_C$ may be used to denote the contact surface inside of an Eulerian cell $\Omega_C$; $\Gamma_C = \Gamma \cap \Omega_C$. For one constraint, the discretized version of equation (11) may have the form:

$$\int_{\Gamma_C} (\Sigma_i N_i v_i^A - \Sigma_i N_i v_i^B) \cdot g \, d\Gamma_C = 0 \tag{12a}$$

where i is an index of vertices and $N_i$ denotes the shape function of the $i^{th}$ vertex and where the shape function may comprise any suitable shape function used for interpolation, integration and/or the like, as is known in volumetric finite element analysis. In some embodiments, these shape functions $N_i$ comprise trilinear shape functions, for example. Recall that two objects A and B in close contact share the same Eulerian discretization in intermediate space 20 and also share the same contact surface. If the shape functions of each of the objects A and B are on the same order, then these shape functions N are identical. Therefore, equation (12a) uses the term $N_i$ for both objects A and B. The normal vector g may be determined using any suitable technique, of which there are many that will be identifiable to those skilled in the art. In some embodiments, the normal vectors g may be determined according to the technique proposed by Levin et al. (2011), where the normal vectors g are evaluated by taking the gradient of the indicator function discussed above. This approach avoids using surface mesh information (e.g. coordinates x of the vertices on the surface in physical space 16). In some embodiments, the normal vectors g may be determined in accordance with the method proposed by Fan et al. 2013, Eulerian-on-Lagrangian Simulation. *ACM Trans Graph.* 32, 3 (July), 22:1-22:9, which is hereby incorporated herein by reference and which is referred to herein as Fan et al. (2013). The Fan et al. (2013) technique involves determining the normal vectors g after reconstruction of the surface mesh(es) of the object(s) in physical space 16, by determining the normal vector g for an Eulerian cell to be a weighted average of normals computed on surface mesh components (e.g. surface triangles in the case where the surface mesh is a triangular mesh). These surface mesh components can be from either one of the objects, or both of the objects.

The equation (12a) constraints for objects identified as being in close contact can be assembled into a global constraint matrix:

$$G_{CC} v = h \tag{12b}$$

The equation (12b) close contact constraints may be updated and used in the soft-tissue QP evaluated at each time step of the simulation as discussed in more detail below. This formulation of close contact constraints eliminates the need for any computationally expensive collision detection for objects known to be in close contact. Accordingly, this formulation of close contact constraints increases computational efficiency when compared to prior art techniques.

Simulation of Musculoskeletal System

In some embodiments, the model 10 for simulating a musculoskeletal system 10A comprises using a modular architecture which separates the musculoskeletal system 10A into a skeleton-tendon subsystem and a soft-tissue subsystem, wherein the skeleton-tendon subsystem and soft-tissue subsystem are coupled to one another in a manner which facilitates modeling of the musculoskeletal system 10A as a whole. The skeleton-tendon subsystem may also be referred to herein as the skeleton subsystem, the bone subsystem and/or the rigid-body subsystem. The soft-tissue subsystem may also be referred to as the muscle subsystem. The separation of musculoskeletal system 10A into the coupled skeleton-tendon and soft-tissue subsystems allows the use of existing multibody simulators for modeling the skeleton-tendon subsystem as a rigid-body system together with the soft-tissue simulation techniques described herein. Some embodiments involve the enforcement of coupling constraints (e.g. via attachment constraints described below) between these subsystems to achieve this modularization.

Figure 4:
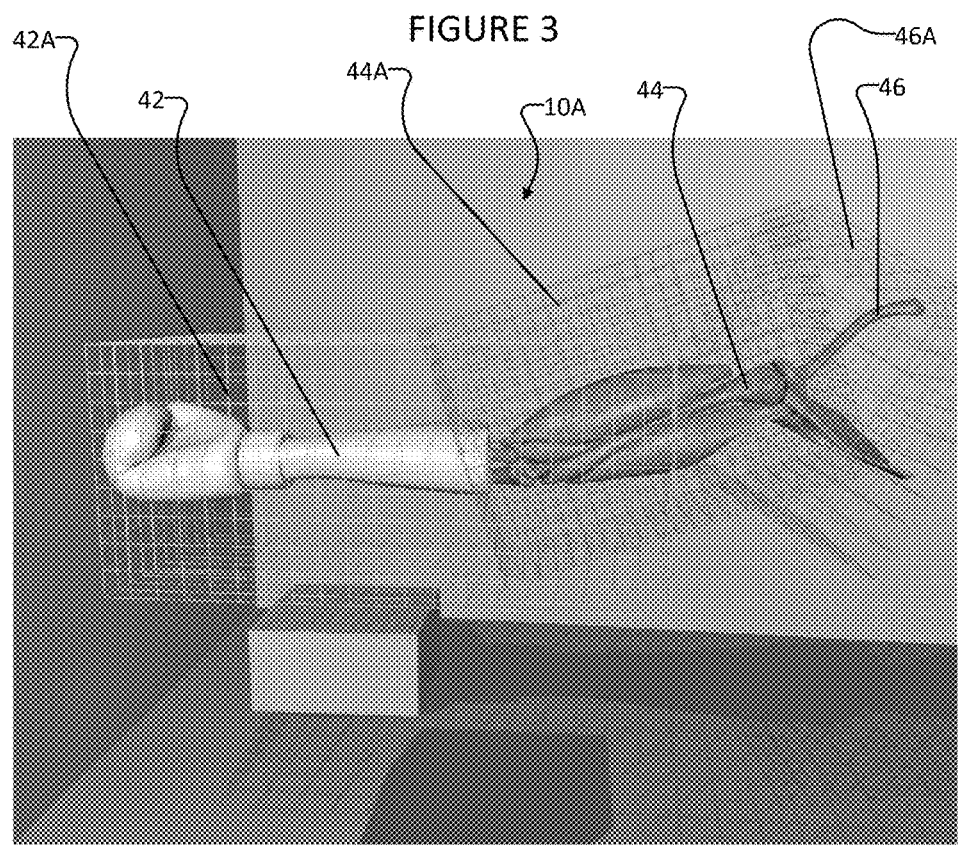
FIG. 4 schematically depicts a musculoskeletal system of a portion of a human arm which may be modelled according to a particular example simulation.

FIG. 4 schematically depicts the musculoskeletal system 10A of a portion of a human arm which may be simulated according to a particular example embodiment. In the exemplary FIG. 4 simulation, the bone-tendon (rigid-body) subsystems modelled include the body segments corresponding to the forearm 42, the upper arm 44 and a portion of the shoulder 46. In the exemplary FIG. 4 simulation, the forearm body segment 42 comprises a non-active soft-tissue subsystem which comprises a pair of elastically deformable bodies (the forearm soft tissue and the boxing glove). In the exemplary FIG. 4 simulation, the upper arm body segment 44 comprises biceps, triceps and brachialis, each of which is modelled as a deformable soft-tissue object with activation. In the exemplary FIG. 4 simulation, the shoulder segment 46 does not include any soft tissue. FIG. 4 shows that each of body segments 42, 44, 46 comprises a corresponding Eulerian grid 42A, 44A, 46A and that these Eulerian grids are joined together in a piecewise continuous manner. As discussed above, the mapping $\phi_1$ for each body segment 42, 44, 46 of the FIG. 4 exemplary simulation may be considered to be like rotational and/or translational motion of its corresponding Eulerian grid 42A, 44A, 46A without deformation.

Skeleton and Tendons

In general, the skeleton is well approximated as a system of rigid bodies (bones) connected by joints. The dynamics of such systems have been thoroughly studied and understood, in robotics, computer graphics, and biomechanics. Accordingly, this description of modeling the skeleton is brief. In biomechanical systems, muscles may be connected to distant bones via long stiff tendons that span multiple joints. In some embodiments, tendons may be assumed to be inextensible and the kinematics of tendons may be represented using their "moment arms" at each joint. Tendon excursions e may therefore be kinematically coupled to the skeleton configuration q, where q is a set of configuration variables that may be used to describe the skeleton configuration.

Particular embodiments may make use of any suitable multibody simulator with the above features for simulating the rigid bodies of the skeleton. In some embodiments, unreduced coordinates may be used for bones and explicit constraints may be used to model joints. Data such as the moment arms of particular tendons are described, for example, in Holzbaur et al. 2005. A model of the upper extremity for simulating musculoskeletal surgery and analyzing neuromuscular control. *Annals of Biomedical Engineering* 33, 6, 829-840, which is hereby incorporated herein by reference.

Some embodiments comprise modeling the attachment of muscles to bones (e.g. via tendons) using constraints on the Eulerian soft-tissue simulation due to such attachments. Typically, the proximal (origin) end of a muscle attaches over a broad area of a bone, and the distal (insertion) end of a muscle has a more prominent tendon. For example, the brachialis muscle has a relatively large area of origin on the humerus and the distal end connects to the forearm via a tendon. For a muscle with an attachment boundary F (at either the origin or the insertion), some embodiments comprise enforcing the Eulerian velocity on F to be the same as the tendon velocity e relative to the reference bone used to model the muscle according to $$v^{n+1}(x)=\dot{e}; x \in S \qquad (13)$$

where $S \subseteq \Gamma$ is the attachment surface. The position of the attachment surface S in physical space 16 is determined by excursion e of the tendon and skeletal motion (e.g. the rigid-body simulation described in more detail below). Writing v in terms of shape functions $N_i$ and integrating equation (13) over an Eulerian grid cell $\Omega_c$ yields $$\int_{\Gamma \cap \Omega_c} \Sigma_i N_i v_i^{n+1} \partial = \dot{e} \int_{\Gamma \cap \Omega_c} \partial \Gamma \qquad (14)$$

In the case of muscle-bone attachments, ė on the attachment area is zero throughout the simulation in embodiments where the bones are fixed with respect to the Eulerian simulation grid—i.e. in embodiments where the Eulerian grid is not deformed during simulation. It should also be noted that a muscle typically has two attachments (and two corresponding constraints), one for origin and the other for insertion. These attachment constraints may be globally assembled to yield:

$$G_A v = a \qquad (15)$$

where $G_A$ is the attachment constraint matrix, v is the velocity and a represents a parameter of the constraints as formulated in equation (15).

Attachment constraints produce a coupling impulse $p_A$ on bone and tendon. With this impulse included, the skeleton-tendon system's dynamics is described by the QP:

$$\dot{q}^{n+1} = \underset{\dot{q}}{\operatorname{argmin}} \frac{1}{2} \dot{q}^T M_S \dot{q} - \dot{q}^T (p_s^n + p_A^n) \qquad (16)$$

subject to $G_S \dot{q} \le d$ where: q̇ is a configuration variable vector corresponding to $\dot{q}=(\dot{x},\dot{y},\dot{z},\alpha,\beta,\gamma)$, where $(\dot{x},\dot{y},\dot{z})$ represent linear translational velocities, and $(\alpha,\beta,\gamma)$ represent angular velocities; $M_S$ is the skeletal inertia tensor; $p_S$ is the external impulse; $p_A$ is the coupling impulse resulting from the attachment constraints between the skeletal subsystem and the soft-tissue subsystem (e.g. associated with tendons); and $G_S$ is a matrix which may include equality and/or inequality constraints which constrain the motion of bones due to corresponding joints. It should be noted that equation (16) is the same as equation (1b) presented above. It should be noted that in the equation (16) representation, all of the defined quantities are assembled (e.g. concatenated into the corresponding vectors and matrices). The constraints in equation (16) are written as inequalities for generality, even though most joint constraints will be equalities. Inequality constraints can enforce, for example, joint angle bounds.

As discussed above in connection with equation (1a) and in view of the discussion of the various constraints herein (e.g. activation, volume preservation, close contact and/or attachment to the bone/tendon subsystem), the muscle QP of equation (1a) can be re-written in the form:

$$v^{n+1} = \underset{v}{\operatorname{argmin}} \frac{1}{2} v^T M v - v^T p_B^n \qquad (17)$$

subject to $G_V v = c, G_C v \le r, G_A v = a, G_{CC} v \le h$ where: v is the velocity on the Eulerian grid vertices y; M is a generalized mass matrix; $P_B$ is the impulse due to advection and any other internal or external forces; $G_V$ is the volume preservation constraint; $G_C$ represents the external contact constraints (see the Fan Thesis); $G_A$ represents the equation (15) attachment constraint matrix; and $G_{CC}$ represents the equation (12b) close contact constraint matrix. Some embodiments may comprise simplifying the numerics by lumping mass to the Eulerian grid vertices in intermediate space 20 so that M is diagonal.

When equation (16) is solved for the next time step $t_{n+1}$, it yields $\dot{q}^{n+1}$ which permits the formulation of the attachment constraints $G_A$ using the rigid-body (skeleton/tendon) state at time step $t_{n+1}$, and thereafter solve equation (17) to determine $v^{n+1}$. It should be noted here that the coupling impulses $\lambda_A^{n+1}$ are implicitly computed as the Lagrange multipliers associated with the attachment constraints:

$$p_A^{n+1} = G_A^T \lambda_A^{n+1} \qquad (18)$$

Once $p_A^{n+1}$ is determined, the model can then be advanced to the time step $t_{n+2}$ by solving equation (16) using $p_A^{n+1}$. A description of the simulation method according to a particular embodiment is now described below.

In some embodiments, each time step comprises solving quadratic programming problems for both the skeleton/tendon system (e.g. equation (16)) and the soft-tissue system (e.g. equation (17)). In some embodiments, these QP equations may be solved using a primal-dual active-set method—such as, by way of non-limiting example, the method described by Ito K. and Kunisch, K. 2008. Lagrange Multiplier Approach to Variational Problems and Applications, *Society for Industrial and Applied Mathematics*, which is hereby incorporated herein by reference. This is not necessary, however and other techniques for solving these QP problems could be used. The remainder of this description assumes, without loss of generality, that the active-set method is used for solving the skeletal/tendon and soft-tissue QPs. Each iteration of the active-set method may comprise the solution of a symmetric, indefinite linear system or Karush-Kuhn-Tucker (KKT) system. For the skeletal QP of equation (16), the size is relatively small and, in many circumstances, the constraints associated with the skeletal QP of equation (16) are equality constraints, in which case the skeletal QP reduces to a linear system which may be solved relatively easily using well-known techniques (e.g. Gaussian elimination). In cases where the constraints associated with the skeletal QP comprise one or more inequality constraints, a QP solver similar to that described below for the soft-tissue system may be used to solve the skeletal QP.

The KKT system for the soft-tissue QP is relatively more complex. The KKT system which may be solved for each iteration of the active-set QP solver for the soft-tissue QP of equation (17) is given by:

$$\begin{pmatrix} M & G_V^T & \tilde{G}_C^T & G_A^T & G_{CC}^T \\ G_V & -\varepsilon L & 0 & 0 & 0 \\ \tilde{G}_C & 0 & 0 & 0 & 0 \\ G_A & 0 & 0 & 0 & 0 \\ G_{CC} & 0 & 0 & 0 & 0 \end{pmatrix} \begin{pmatrix} v \\ \lambda_V \\ \lambda_C \\ \lambda_A \\ \lambda_{CC} \end{pmatrix} = \begin{pmatrix} p_B \\ c \\ 0 \\ a \\ h \end{pmatrix} \qquad (19)$$

where $\tilde{G}_C$ is a matrix having the rows from the contact constraint matrix $G_C$ corresponding to active constraints (i.e. constraints determined to be active by the active-set method) and $\lambda_V$, $\lambda_C$, $\lambda_A$, and $\lambda_{CC}$ represent Lagrange multipliers and where equation (19) incorporates active constraints.

Based on testing performed by the inventors, the soft-tissue QP solver which solves equations (17), (19) typically converges within about 5 iterations (using a primal-dual active set method of QP solver) where the number of external contact constraints is relatively low in comparison to the number of degrees of freedom of the simulation (e.g. where the number of contact constraints is less than about 1/100 of the number of degrees of freedom). To solve the linear system of equation (19), any suitable linear solver can be used. In some embodiments, the solver used to resolve equation (19) comprises a sparse direct solver based on lower-upper (LU) factorization.

Figure 11:
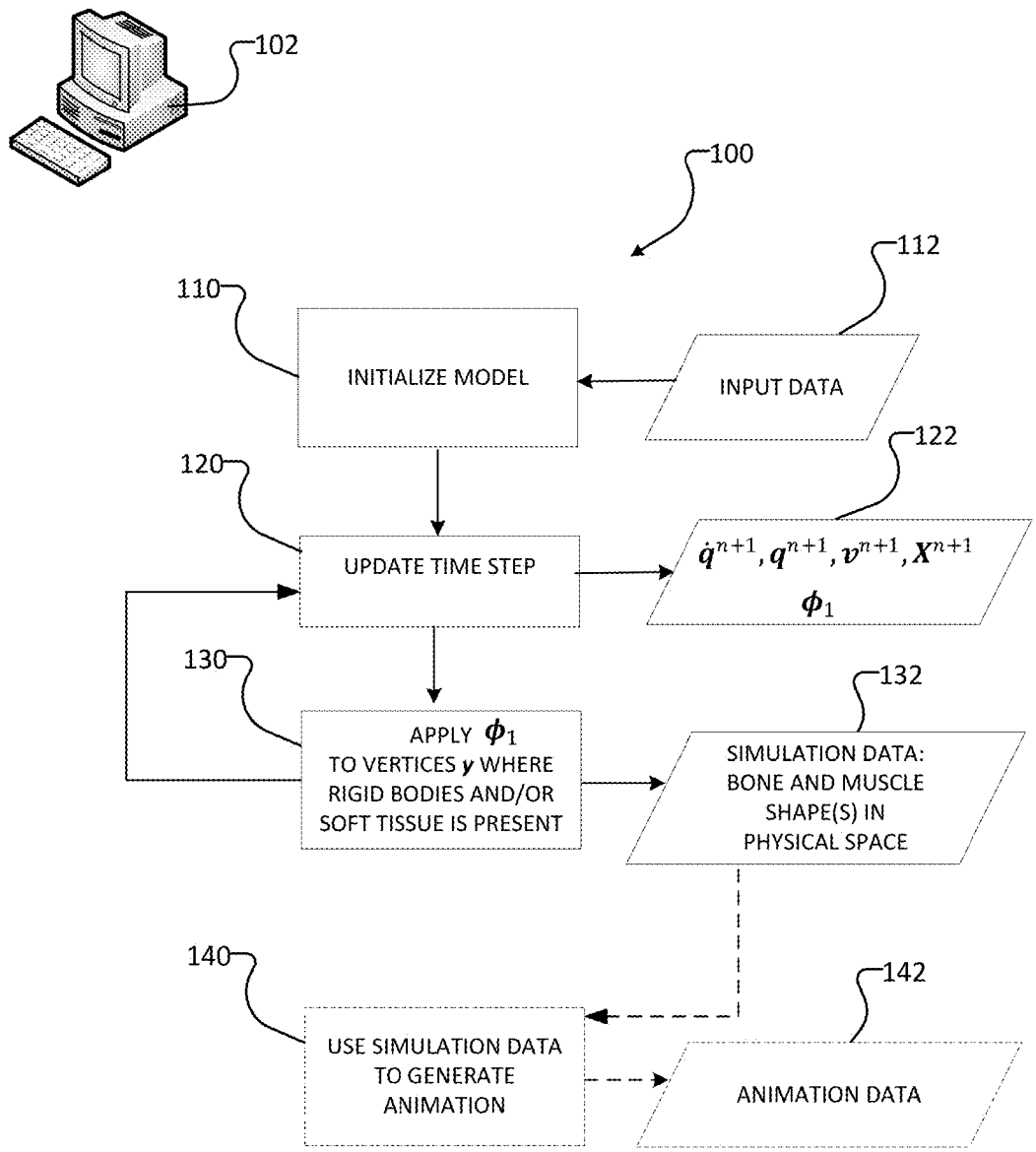
FIG. 11 is a method for simulating movement of a musculoskeletal system according to a particular embodiment.

FIG. 11 schematically depicts a method 100 for simulating a musculoskeletal system 10A (comprising one or more skeletal subsystems and one or more soft-tissue subsystems) to generate corresponding simulation data relating to the musculoskeletal system according to a particular embodiment. Method 100 (and the simulation data generated by method 100) may optionally be used to generate an animation 142 (e.g. CGI animation data) comprising an ordered sequence of complete or partial digital image frames. Method 10A is implemented by one or more suitably configured computer systems 102. In the particular example shown in FIG. 11, method 100 is performed for a single body segment and multiple methods 100 may be coupled to one another to simulate multi-limb musculoskeletal systems. In some embodiments, multi-limb musculoskeletal systems may be simulated together, by permitting deformation of Eulerian grid as described elsewhere in this disclosure. Simulation data output 132 from method 100 comprises a computer-based model of the musculoskeletal system 10A, which models the evolution over time (a plurality of time steps) of the shapes (e.g. in two or three dimensions) of the rigid body objects in the skeletal subsystems and the soft-tissue objects in the soft-tissue subsystems of musculoskeletal system 10A. Such shapes may be maintained using a mesh model comprising vertices, edges and/or the like as described herein. In this sense, the shapes of the various objects output from method 100 as simulation data 132 may comprise the state of deformation of the objects, the location of the objects in one-, two-, three-dimensional space or other multi-dimensional space and/or the orientation of the objects in one, two-, three-dimensional space or other multi-dimensional space. The shapes of the various objects in musculoskeletal system 10A (which form part of simulation data output 132) may be stored in memory accessing to computer system 102, may be displayed on a display of computer system 102 and/or on one or more other displays (not shown) which may receive output data 132 from computer system 102. Simulation data output 132 may be used for a wide variety of applications. By way of non-limiting example, simulation data 132 may optionally be used by computer system 102 (or some external computer system having access to simulation data 132) to generate an animation 142 (e.g. CGI animation data) comprising an ordered sequence of complete or partial digital image frames for use in the film industry, in the video game industry, for virtual reality applications, as well as for applications in physiology, sports, health, medicine, research, and/or the like.

Method 100 commences in block 110 where computer system 102 obtains input data 112 and initializes the simulation. Input data 112 (or various portions thereof) may be obtained in block 110 by any suitable technique. By way of non-limiting example, input data 112 may be input to computer system 102 by a user who may interact with a suitably configured user interface and/or software application, input data 112 may be accessed by computer system 102 from a memory accessible to computer system 102, input data 112 may be communicated to computer system 102 by one or more suitable communication interfaces (e.g. over a computer network), from another software application or computer system and/or the like.

Input data 112 may generally comprise the information used to define or otherwise specify musculoskeletal system 10A and its various skeletal subsystems and soft-tissue subsystems in a manner that permits the computer system 102 to implement method 100. By way of non-limiting example, input data 112 may comprise: a suitable specification (e.g. a mesh-based specification) of the soft tissue objects in the one or more soft-tissue subsystems of musculoskeletal system 10A (e.g. the constitutive properties of the deformable soft-tissue objects, the definition of the shape of the soft-tissue objects in material space 12 (e.g. geometric shape and/or voxel-based shape), activation parameters associated with the soft-tissue objects, initial conditions for the shape and/or activation of the soft-tissue objects, identification (for each soft-tissue object) of other soft-tissue objects and/or skeletal subsystem objects with which the soft-tissue object may be in close contact and/or external contact, attachment parameters which define where the soft-tissue objects are connected to skeletal sub-system objects, Eulerian grid specifications, associations between Eulerian grids and soft-tissue objects and/or the like; a suitable specification (e.g. a mesh-based specification) of the rigid-body objects in the one or more skeletal subsystems of musculoskeletal system 10A (e.g. the density of rigid body objects, the shapes of rigid body objects in material space 12 (e.g. geometric shape and/or voxel-based shape), the locations of tendons which attach the rigid-body objects to soft-tissue objects, initial conditions for the shape (e.g. location and orientation) and velocity of the rigid-body objects, the specification of joints which constrain relative movement between the rigid-body objects, the specification of moment arms of joints which define how rigid body objects are connected to one another, identification (for each rigid-body object) of soft-tissue objects with which the rigid-body object may be in close contact and/or external contact, attachment parameters (e.g. attachment locations, attachment surfaces, tendon directions and/or the like) which define where the rigid-body objects are connected to soft-tissue sub-system objects and/or the like); a suitable specification of the environment in which musculoskeletal system 10A is located (e.g. external forces which may be applied to musculoskeletal system (e.g. gravity), external objects into which the various objects of the musculoskeletal system 10A could come into contact, and/or the like); any other modeling parameters (e.g. the damping coefficient $\gamma$ of the equation (10) volume constraint, size of the discrete time steps and/or the like); input data 112 may also comprise a specification for the Eulerian grid structure of Eulerian space 20; parameters used for constructing a mapping $\phi_1$ which is permitted to vary over a Eulerian grid and/or the like.

Input data 112 may also include the time evolution of various parameters of interest. For example, in some embodiments: input data 112 may comprise the time evolution of the activation level $\alpha$ of any muscle (e.g. where it is desirable to simulate how the output shapes 132 of the objects in the skeletal subsystems and soft-tissue subsystems evolve with the activation level $\alpha$); input data 112 may comprise the time evolution of external forces and/or objects (e.g. where it is desirable to simulate how the output shapes 132 of the objects in the skeletal subsystems and soft-tissue subsystems evolve with such external forces and/or objects); input data 112 may comprise the time evolution of one or more skeletal subsystem objects (e.g. where it is desirable to simulate how the output shapes 132 of other skeletal subsystem objects and/or soft-tissue subsystem objects evolve with the movement of such skeletal subsystem objects); and/or the like.

Initializing the simulation in block 110 may comprise determining or otherwise setting the initial (i.e. times-step $t_0$) simulation variables for subsequent simulation. In some embodiments, such simulation variables may include, by way of non-limiting example, the skeletal subsystem simulation variables $\dot{q}_0, q_0$—e.g. of equations (1b) and/or (16) and an initial mapping $\phi_1$—for each skeletal subsystem in musculoskeletal system 10A and the soft-tissue subsystem simulation variables $v_0, X_0$ (or equivalently, $\phi_{2,0}^{-1}, \dot{\phi}_{2,0}^{-1}$)—e.g. of equations (1a) and/or (17)—for each soft-tissue subsystem in musculoskeletal system 10A. Initializing the simulation in block 110 may comprise determining or otherwise setting the initial (i.e. times-step $t_0$) simulation constraints and/or parameters for subsequent simulation. Such simulation constraints and/or parameters may comprise, for example, any of the constraints, parameters or related variables of equations (1a), (1b), (16), (17) and/or (18). Initializing the simulation in block 110 may comprise determining or otherwise setting the initial (i.e. times-step $t_0$) shapes (in physical space 16) of the rigid-body objects in each skeletal subsystem and soft-tissue objects in each skeletal subsystem of musculoskeletal system 10A. Such initial shapes of the various objects may be specified by the locations of corresponding mesh vertices and may comprise the state of deformation of the objects, the location of the objects in one-, two-, three-dimensional space or other multi-dimensional space and/or the orientation of the objects in one-, two-, three-dimensional space or other multi-dimensional space. The block 110 initialization may, in some embodiments, comprise setting the initial state for time varying parameters of input data 112.

After initialization in block 110, method 100 proceeds to block 120 which comprises advancing the simulation by one discrete time step (e.g. from time $t_n$ to time $t_{n+1}$) and obtaining the simulation variables for the next time step $t_{n+1}$. In the illustrated embodiment, the simulation variables output from block 120 comprise the simulation variables of $\dot{q}^{n+1}, q^{n+1}, v^{n+1}, X^{n+1}$ of equations (1a) and (1b) or of equations (16) and (17) and, in some embodiments, the mapping $\phi_1$, which maps between intermediate space 20 and physical space 16 (see FIG. 1). Note that, in some embodiments, the mapping $\phi_1$ can differ from time step to time step with Lagrangian movement of the corresponding body segment.

Figure 12:
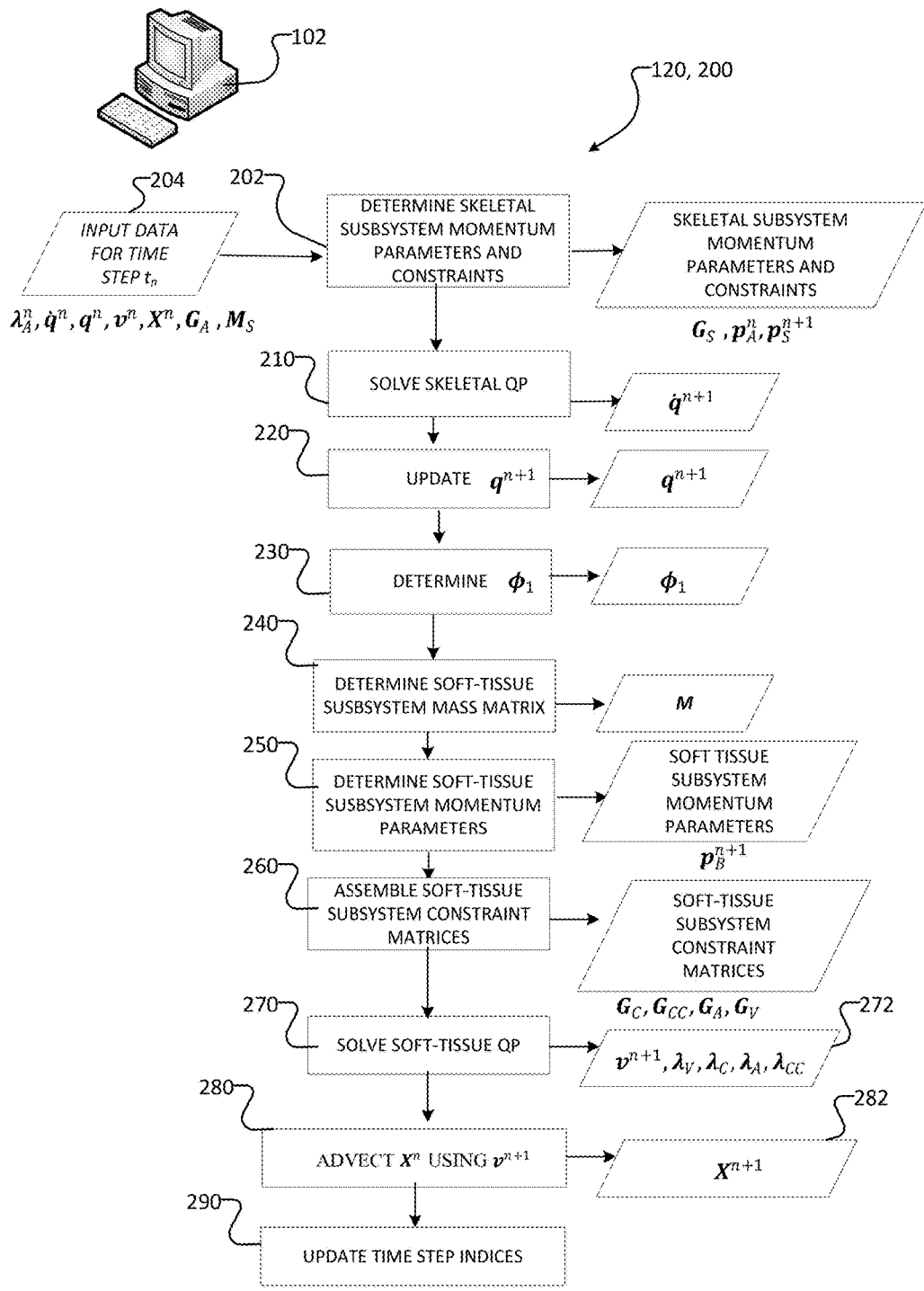
FIG. 12 is a method for updating the time step and the corresponding variables which may be used as part of the FIG. 11 simulation method according to a particular embodiment.

FIG. 12 schematically illustrates a method 200 that may be used to advance the simulation by one time step (e.g. to implement block 120 of the FIG. 11 method 100) according to a particular embodiment. Method 200 may be implemented by computer system 102, which may be the same computer system 102 used to implement method 100 or a different computer system 102. Method 200 involves obtaining input data 204. Input data 204 may be obtained in a manner similar to that of input data 112 obtained in block 110 of method 100 (FIG. 11). Input data 104 may also comprise any of input data 112 and any data from previous iterations of method 200 (e.g. block 120 of method 100). In the particular case of the illustrated embodiment, input data 204 may comprise, without limitation, $\lambda_A^n, \dot{q}^n, q^n, v^n, X^n, G_A^n$, $M_S$, where the index n refers to the current time step index (or the time step index of the output from the previous iteration of method 200), Method 200 commences in block 202 which comprises determining the skeletal subsystem momentum parameters and constraints for the stacked system of rigid-body object in the skeletal subsystem based on input data 204. In the illustrated embodiment, skeletal subsystem momentum parameters and constraints determined in block 202 may comprise, without limitation, $G_S, p_A^n, p_S^{n+1}$. The block 202 determination of $G_S$ may be based, at least in part, on $q^n$ and $\dot{q}^n$ from a previous iteration of method 200 and/or on one or more aspects of input data 112 (FIG. 11). The block 202 determination of $p_A^n$ may be based, at least in part, on the equation $p_A^n = G_A^T \lambda_A^n$ (where $G_A^T$ and $\lambda_A^n$ are parameters determined in a previous iteration of method 200) and/or on one or more aspects of input data 112 (FIG. 11). The block 202 determination of $p_S^{n+1}$ may be based, at least in part, on the mass matrix $M_s$ and $\dot{q}^n$ from a previous iteration of method 200 and/or on one or more aspects of input data 112 (FIG. 11). In general, skeletal subsystem momentum parameters and constraints determined in block 202 may comprise any information desirable to solve the skeletal QP (e.g. the equation (1b) QP or equation (16) QP).

From block 202, method 200 proceeds to block 210 which comprises solving the skeletal QP (e.g. the equation (1b) QP or equation (16) QP) for the stacked system of rigid bodies (e.g. body segments) in the skeletal subsystem to obtain QP output comprising the time derivative of the skeletal configuration variable for the next time step (e.g. $\dot{q}^{n+1}$). The skeletal QP output $\dot{q}^{n+1}$ may then be used in block 220 of method 200 to determine the skeletal configuration variable for the next time step (e.g. $q^{n+1}$). In some embodiments, block 220 may comprise determining $q^{n+1}$ based, at least in part, on the equation $q^{n+1} = q^n + dt \dot{q}^{n+1}$ and/or on one or more aspects of input data 112 (FIG. 11).

Figure 13:
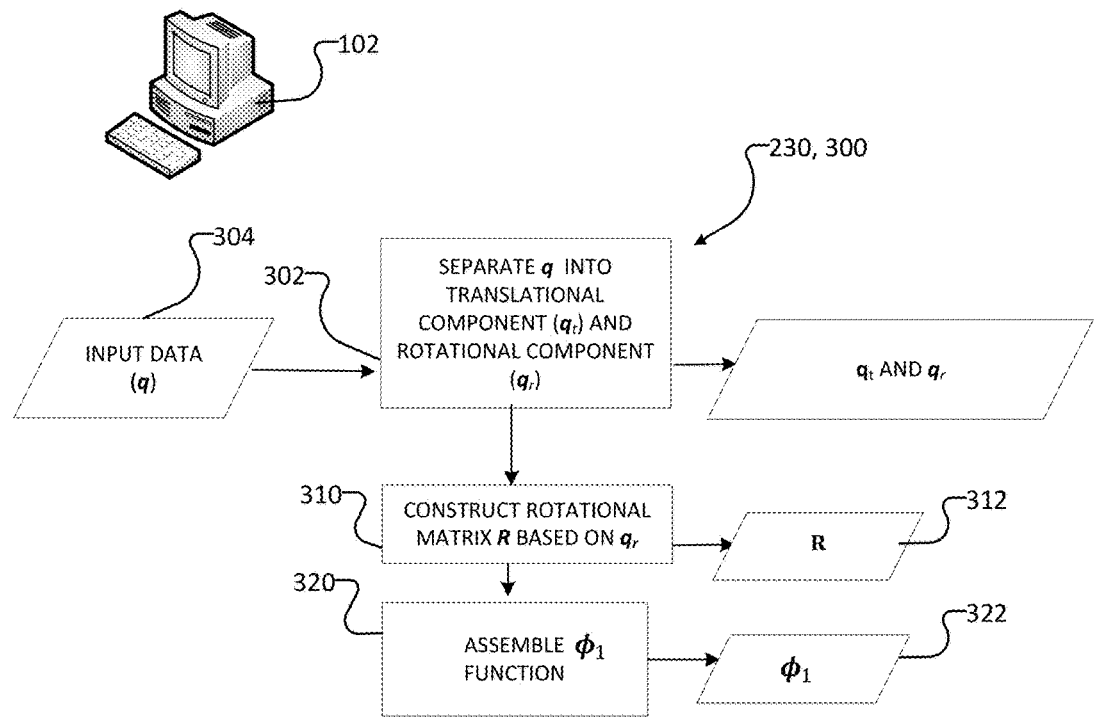
FIG. 13 is a method for determining the mapping $\phi_1$ based on the configuration variables of the skeletal subsystem which may be used as part of the FIG. 11 simulation method and/or the FIG. 12 time-step-update method according to a particular embodiment.

After solving the skeletal QP and determining the skeletal subsystem configuration variable $q^{n+1}$, method 200 proceeds to block 230 which comprises determining the mapping $\phi_1$ for the time step index n+1 based on the skeletal subsystem configuration variable $q^{n+1}$. FIG. 13 schematically depicts a method 300 for determining the mapping $\phi_1$ based on the configuration variables of the skeletal subsystem according to a particular embodiment. In some embodiments, method 300 may be used to implement block 230 of method 200 (FIG. 12). In some embodiments, method 300 may be independent of method 200 and may provide a step in method 100 (FIG. 11).

As discussed above, the time derivative of the skeletal subsystem configuration variable (e.g. $\dot{q}^{n+1}$) determined in block 210 of method 200 may have the form $\dot{q} = (\dot{x}, \dot{y}, \dot{z}, \dot{\alpha}, \dot{\beta}, \dot{\gamma})$ for each rigid body, where $(\dot{x}, \dot{y}, \dot{z})$ represent linear translational velocities, and $(\dot{\alpha}, \dot{\beta}, \dot{\gamma})$ represent angular velocities. Accordingly, the configuration variable $q^{n+1}$ determined in block 210 of method 200 may have the form $q = (x, y, z, \alpha, \beta, \gamma)$ for each rigid body, where $(x, y, z)$ represent linear translations and $(\alpha, \beta, \gamma)$ represent angular displacements. In some embodiments, $\dot{q}^{n+1}$ and $q^{n+1}$ may comprise any general form of Lagrangian configuration variables. Using a vector $q = (x, y, z, \alpha, \beta, \gamma)$ of this form, determining a Langragian rotational and translational mapping $\phi_1$ may be accomplished by any of a variety of well-known techniques. Method 300 of FIG. 13 is merely exemplary of one of such techniques. It will be appreciated that determining $\phi_1$ in block 230 of method 200 (FIG. 12) may be accomplished by method 300 of FIG. 13 and/or by any other of these techniques.

Method 300 commences in block 302 which obtains input data 304 comprising configuration variable $q^{n+1}$ for each rigid body object (e.g. from block 220 of method 200 (FIG. 12)). Block 302 involves splitting configuration variable $q^{n+1}$ into a translational component $q_t$ and a rotational component $q_r$. In the case where input data 304 has the form $q=(x,y,z,\alpha,\beta,\gamma)$, the block 302 separation procedure may be performed by setting $q_t=(x,y,z)$ and $q_r=(\alpha,\beta,\gamma)$. Method 300 then proceeds to block 310 which involves using the block 302 rotational component $q_r$ (e.g. $q_r=(\alpha,\beta,\gamma)$) to construct a rotational matrix R. As will be appreciated by those skilled in the art, this block 310 construction of rotational matrix R may be performed by any of a variety of known techniques. Once the rotational matrix R is obtained in block 310, method 300 advances to block 320 which comprises assembling the $\phi_1$ function. The block 320 $\phi_1$ function may be constructed in a manner such that $x=\phi_1(y)=Ry+q_t$. The output of block 320 (and method 300) is the $\phi_1$ function.

Returning to method 200 (FIG. 12), once $\phi_1$ is determined in block 230, method 200 advances to block 240 which comprises determining the soft-tissue mass matrix M—e.g. a globally assembled mass matrix M for the soft-tissue objects in the soft-tissue subsystem, which may comprise a diagonally assembled matrix where each block of the diagonal structure corresponds to a mass matrix of a soft-tissue object. The block 240 mass matrix M determination may be based, at least in part, on the simulation variable $X^n$ (or equivalently $\phi_2^{n-1}$) from a previous iteration of method 200 and/or on one or more aspects of input data 112 (FIG. 11). Method 200 then proceeds to block 250 which involves determining the soft-tissue subsystem momentum parameters (e.g. $p_B^{n+1}$) for the soft-tissue object in the soft-tissue subsystem. Determining the block 250 soft-tissue subsystem momentum parameters $p_B^{n+1}$ may be based, at least in part, on advecting $v^n$, $X^n$ from a previous iteration of method 200, on the mass matrix M obtained from block 240 and/or on one or more aspects of input data 112 (FIG. 11).

Method 200 then proceeds to block 260 which involves assembling the constraint matrices for soft-tissue objects in the soft-tissue subsystem. In some embodiments, these block 260 constraint matrices may comprise, without limitation, the matrices $G_C, G_{CC}, G_A, G_V$ (see equation (17)). Determining the block 260 constraint matrices $G_C, G_{CC}, G_A, G_V$ may be based, at least in part, on $\phi_1$, $X^n$ and the above-discussed indicator function $(I(\phi^{-1}(x)))$ obtained from a previous iteration of method 200 and/or on one or more aspects of input data 112 (FIG. 11).

Method 200 then proceeds to block 270 which involves solving the soft-tissue QP (e.g. the equation (1a) QP or the equation (17) QP) to obtain the simulation variable $v^{n+1}$ and the simulation parameters $\lambda_V, \lambda_C, \lambda_A, \lambda_{CC}$ for the stacked system of soft-tissue objects in the soft-tissue subsystem. The soft-tissue QP output $v^{n+1}$ may then be used in block 280 of method 200 to advect $X^n$ from the previous iteration of method 200 and to thereby obtain $X^{n+1}$. Advection is a well understood process in used in Eulerian mechanics. The output of method 200 may comprise any of the data included in the FIG. 12 illustration of method 200 and, as shown in block 120 of FIG. 11, may include of $\dot{q}^{n+1}, q^{n+1}, \dot{X}^{n+1}, X^{n+1}$ of equations (1a) and (1b) or of equations (16) and (17) and, in some embodiments, the mapping $\phi_1$, which maps between intermediate space 20 and physical space 16 (see FIG. 1).

Before concluding, method 200 may proceed to block 290, where the time step indices are updated prior to the next iteration of method 200. For example, the time $t_{n+1}$ may become $t_n$ for the next iteration of method 200.

Returning to method 100 (FIG. 11), at the conclusion of block 120, method 100 proceeds to block 130, where the mapping $\phi_1$ (e.g. determined in block 120 and/or in a separate step of method 100 (not shown)) is applied to any Eulerian vertices y in intermediate space 20 where rigid body objects and/or soft-tissue objects are present. This process is described in Fan et al. 2013 (see section 8.3). This block 130 process may comprise using the above-described indicator function $(I(\phi^{-1}(x)))$ to determine the Eulerian vertices y in intermediate space 20 for which rigid body objects and/or soft-tissue objects are present. This block 130 process may comprise surface reconstruction of the soft-tissue and/or rigid-body objects in Eulerian space 20 prior to application of the mapping $\phi_1$ or surface reconstruction of the soft-tissue and/or rigid-body objects in physical space 16.

The simulation data output 132 of the block 130 mapping comprises the shapes of the soft-tissue and rigid-body objects of musculoskeletal system 10A in physical space 16. Such shapes may be maintained using a mesh model comprising vertices, edges and/or the like as described herein. Each iteration of block 130 may output simulation data 132 (the shapes of various objects in musculoskeletal system 10A) for a particular time step, As discussed above, the shapes of the various objects output from method 100 as simulation data 132 may comprise the state of deformation of the objects, the location of the objects in one-, two-, three-dimensional space or other multi-dimensional space and/or the orientation of the objects in one-, two-, three-dimensional space or other multi-dimensional space. After performing block 130, method 100 loops back to block 120 to advance the method 100 simulation to the next time step.

Simulation data 132 generated by method 100 may then optionally be used in block 140 to generate an animation 142 comprising an ordered sequence of complete or partial digital image frames often referred to as Computer-Generated Imagery (CGI) video data, CGI animation data or CGI moving picture data. In the illustrated embodiment of FIG. 11, block 140 is performed by computer system 102. This is not necessary in general. In some embodiments, computer system 102 may generate simulation data 132 which may then be used by another computer system (not shown) to perform block 140 and generate animation 142. As described herein, simulation data 132 comprises the locations (at each time step) of the vertices of one or more meshes representing the musculoskeletal system 10A (including the rigid body subsystem and its one or more rigid body objects and the soft-tissue subsystem and its one or more soft-tissue objects) in physical space 16. Block 140 may involve generating the image frames of animation 142 based at least in part on these meshes and/or other geometric models. In general, block 140 may use any suitable technique for generating an image based on a 3D mesh and may repeat this process a number of times (e.g. over a number of time steps which may, but need not necessarily, be related to the time steps of the method 100 simulation) to generate a sequence of image frames that make up the animation. The process of generating an image from a 3D mesh or other geometric model is known as rendering and is described, for example, at https://en.wikipedia.org/wiki/Rendering_(computer_graphics) or in Computer Graphics: Principles and Practice by John F. Hughes, Andries van Dam, Morgan McGuire, David F. Sklar, James D. Foley, Steven K. Feiner, Kurt Akeley. Any suitable rendering process known in the art may be used in block 140. In addition to using the 3D meshes of simulation data 132, the block 140 rendering technique may use other information or models such as, by way of non-limiting example, models for the interaction of light with various objects.

Experimental Results

The inventors have performed a number of experiments to validate a number of the concepts used in the simulation and animation methods and systems according to various embodiments.

Temporal Simulation Performance

Table 1 gives experimental running time information for full arm simulations according to a particular non-limiting example embodiment. Over the Table 1 simulations, the number of constraints (e.g. volume-preservation constraints, attachment constraints, and close contact constraints) did not change significantly. The Table 1 statistics are representative for most of the time steps. In some embodiments, the simulation may be implemented by in part by the graphics processing unit (GPU) and in part by the central processing unit (CPU) of a corresponding computer system. For example, the solver part and matrix assembly part of a simulation may be performed by the CPU, while the other procedures involved in the simulation may be performed by the GPU. Table 1 shows that subsampling takes a relatively large amount of time as compared to the other Table 1 columns. In particular embodiments, subsampling may be used for evaluating the mass matrix, formulating the volume preservation constraints and formulating the close contact constraints. In the experimental simulations of Table 1, subsampling is performed in all of the Eulerian cells (including those cells that are empty and located a large distance from any objects and including those cells associated with the interior of objects). In some embodiments, such empty cells and/or interior cells may be removed from the subsampling procedure to save time and/or computational expense.

Figures 5A, 5B, 5C:
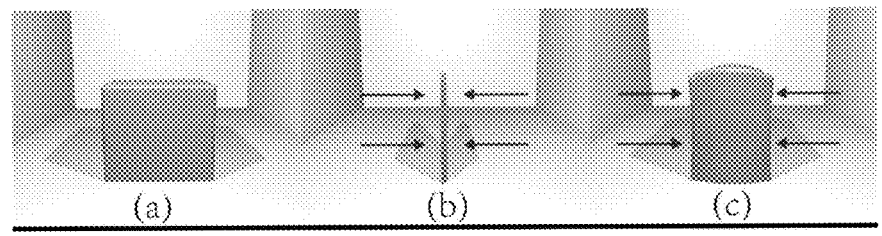
FIGS. 5A-5C show an example deformable object in various scenarios used to evaluate volume preservation constraints.

Table 1 shows statistics for a typical time step of an experimental simulation in milliseconds where the experiment is performed on an i7, 2.67 GHz CPU with a GTX 660 graphics card. Row 1 of Table 1 shows the typical results of an isometric activation example with soft tissues on the upper arm. Row 2 of Table 1 shows the typical results of a full arm dynamics example.

preservation constraints, the original FIG. 5A cube is compressed to a sheet under the force field. FIG. 5C shows a simulation of the same cube, but with the volume preservation constraints with positional stabilization (i.e. drift compensation) discussed above—e.g. equation (10). FIG. 5C shows how the original Figure 5A cube barely loses any volume when the volume preservation constraints are applied.

The inventors have run three simulations for the FIG. 5 scenario: no volume preservation constraints; velocity volume preservation only (i.e. equation (6)) in the absence of a stabilization term; and velocity volume-preservation with positional stabilization (i.e. equation (10)). The total volume change over time is shown in FIG. 6. The three lines 50, 52, 54 correspond to the three simulation scenarios: no volume preservation constraints (line 50); velocity volume preservation only (line 52) in the absence of a stabilization term; and velocity volume-preservation with positional stabilization (line 54). The non-volume-preserving object (line 50) loses volume from the very beginning and is quickly compressed to a sheet. In contrast, volume-preserving solids (lines 52 and 54) are more resistant to volume change under the external force field. The $\nabla \cdot v = 0$ formulation (i.e. volume preservation without stabilization—line 52) loses volume over time. The volume preservation with un-damped positional stabilization (i.e. the equation (10) constraint shown in line 54) exhibits almost constant volume. The maximum volume change does not exceed 0.2% of the original volume. This result demonstrates that the equation (10) volume preservation constraint enforces volume preservation well and prevents numerical drift from accumulation.

FIGS. 7A and 7B demonstrate an experiment showing the application of external contact constraints ($G_C v \leq 0$ of equation (17)) where two bunnies are dropped and impact the ground (an external contact force) at high speed. FIG. 7A shows the simultaneous application of volume-preservation constraints (equation (10)), whereas there are no volume-preservation constraints applied in FIG. 7B. FIGS. 7A and 7B capture the moment when the two bunnies touch the ground and undergo large deformation due to the external contact force. It is clear by inspection of FIGS. 7A and 7B that the non-volume-preserving bunny (FIG. 7B) has experienced a significant volume loss near the contact area when compared to the volume preserving bunny (FIG. 7A).

TABLE 1

Experimental Temporal Statistics

| Upper Arm Grid Resolution | Forearm Grid Resolution | Simulation Degrees of Freedom | Subsampling (ms) | Matrix Assembly (ms) | Soft Tissue Solver (ms) | Skeleton Solver (ms) | Total (ms) |
|---|---|---|---|---|---|---|---|
| 7 objects of 3D grid resolution 55 × 43 × 30 | 2 objects of 3D grid resolution 42 × 20 × 21 | 44394 | 1815 | 588 | 799 | 70 | 3526 |
| 6 objects of 3D grid resolution 55 × 43 × 30 | 2 objects of 3D grid resolution 42 × 20 × 21 | 20615 | 1486 | 456 | 118 | 66 | 2316 |

Volume Preservation

To validate the effectiveness of the volume-preserving constraint with damped positional stabilization (e.g. equation (10)), the inventors simulated the effect of a force field on a deformable cube using different methods. The cube was placed in a large horizontal force field, wherein the magnitude of the force was uniform over the whole space, but the direction of the force differed throughout the space. FIG. 5A shows the original shape of the cube. FIG. 5B shows a simulation of the applied external force field without volume preservation constraints and how, in the absence of volume Eye Muscle—from MRI to Movement To demonstrate the efficacy of the muscle-activation simulation techniques described herein, the inventors simulated the extraocular muscles and the eyeball using the techniques described herein. FIGS. 8A and 8B respectively depict raw MRI images when the eye is looking outward (FIG. 8A) and toward the nose (FIG. 8B). FIG. 8B shows that when looking toward the nose, the Medial Rectus (MR) muscle is highly active and the Lateral Rectus (LR) muscle is relaxed. FIG. 8A shows that when looking outward, the LR is active and the MR is relaxed. From the MRI data of FIGS. 8A and 8B, the inventors were able to obtain muscle shapes for individual muscles in different states of activation. As a first approximation, the inventors took the most relaxed muscle shape as the passive shape (corresponding to $\alpha=0$) of the muscle and the most active muscle shape as the active shape (corresponding to $\alpha=1$). The inventors then simulated eyeball movements assuming the eyeball to be a rigid body and using these muscle shapes (i.e. the muscle shapes derived from the MRI images) for activation.

The muscle shape results (shown in FIGS. 8C, 8D and 8E) deform realistically during movement. In FIGS. 8D and 8E, the rotation of the eye slightly undershoots the expected target. This may be due to the several approximations made. For example: among the six extraocular muscles, only the two most useful for horizontal movement of the eyeball were modeled; and the other soft tissues in the eye were not incorporated into the simulation.

Isometric Activation

Many prior art muscle models used for visual effects (e.g. CGI effects and/or the like) are driven by skeleton motion specified by an animator or other artist, but active muscles change shape even when there is no change in total length. The muscle-activation simulation proposed herein is able to account for such isometric muscle contraction, as can be seen by comparing FIG. 9A (no activation ($\alpha=0$)) to FIG. 9B ($\alpha>0$). For the purposes of obtaining FIGS. 9A and 9B, all of the bone degrees of freedom (DOFs) are fixed and then the biceps and the brachialis are fully activated ($\alpha=1$). FIGS. 9A and 9B show that muscle deformation and activation may be simulated (e.g. for isometric activation or otherwise) without relying on skeleton configurations.

General Soft Tissue Simulation

The methods for soft-tissue simulation described herein extend to soft-tissue objects other than muscles. Tissues such as fat and skin have different constitutive material properties than muscles, but they are also volume preserving and are in close contact with muscles. The methods for soft-tissue simulation described herein can simulate other tissues the same way as for other muscles, by adding appropriate constraints. FIGS. 10A and 10B respectively depict examples with passive activation ($\alpha=0$) and activation ($\alpha>0$), where the muscles on the humerus are wrapped using an incompressible soft tissue object. That tissue is hollow inside, but has close contact constraints with neighbouring muscles and bones. Due to incompressibility, the soft tissues wrapped around the biceps bulge appropriately, as can be seen by comparing FIGS. 10A and 10B. As a side effect, this unified tissue simulator outputs dynamic skin as a direct result of the simulation, and needs little or no additional skinning effort, which is normally a necessary part of creating (rendering) digital images based on 3D models of characters' bodies. Skinning, in general, generates the outermost layer of a character body based on its internal structures. In some embodiments, the soft-tissue models described herein can be used as described above to simulate the skin overtop of a musculoskeletal system and can thereby reduce the effort associated with skinning when generating a corresponding animation (see block 140 of method 100 (FIG. 11)).

The methods described herein may be implemented by one or more suitable computers, which may, in some embodiments, comprise components of suitable computer systems and/or by specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. By way of non-limiting example, such computers could comprise part of a computer-graphics or animation system. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), field programmable gate arrays ("FPGAs")), pluralities of the foregoing and/or the like. Examples of programmable data processors are: microprocessors, digital signal processors ("DSPs"), embedded processors, graphics processors, math co-processors, general purpose computers, server computers, cloud computers, mainframe computers, computer workstations, pluralities of the foregoing and/or the like. Such a computer may have access to software which may be stored in computer-readable memory accessible to the computer and/or in computer-readable memory that is integral to the computer. The computer may be configured to read and execute such software instructions and, when executed by the computer, such software may cause the computer to implement some of the functionalities described herein.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

While processes or blocks are presented herein in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Certain implementations of the invention comprise computers and/or computer processors which execute software instructions which cause the computers and/or processors to perform a method of the invention. For example, one or more processors in a computer system may implement data processing steps in the methods described herein by executing software instructions retrieved from a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical (non-transitory) media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory or the like. The instructions may be present on the program product in encrypted and/or compressed formats.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, controller, processor, assembly, device, component, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Figure 14A:
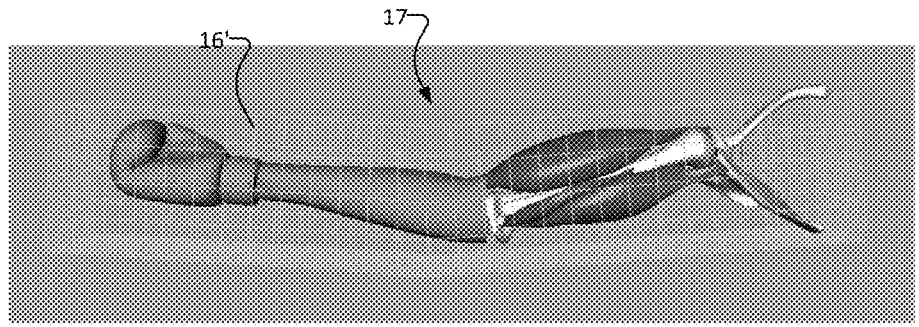
FIGS. 14A and 14B show various views of a musculoskeletal system corresponding to a portion of a human arm which may be modelled using a deformable Eulerian grid according to a particular simulation embodiment.
Figure 14B:
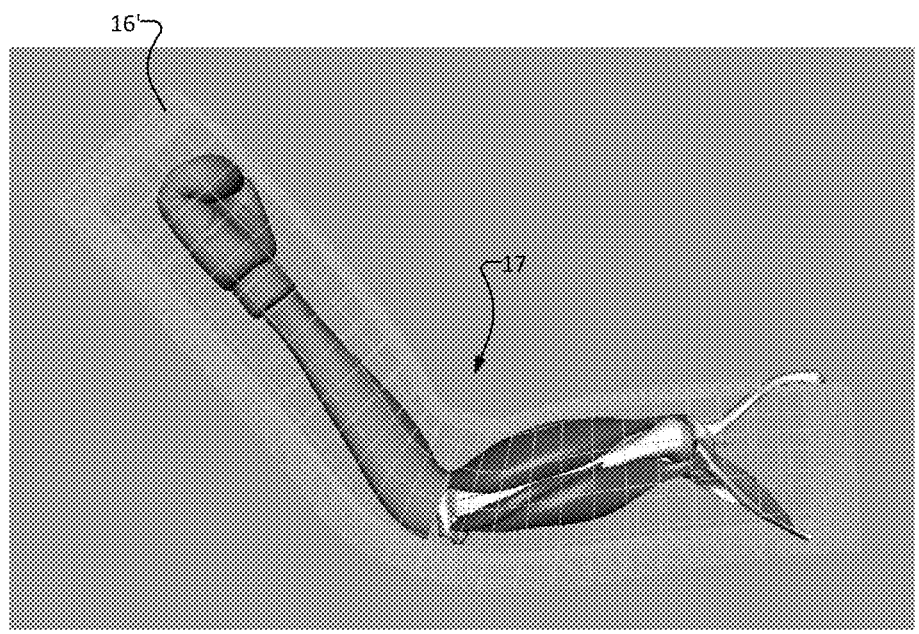

While a number of exemplary aspects and embodiments are discussed herein, those of skill in the art will recognize certain modifications, permutations, additions and sub-combinations thereof. For example:

- In the embodiments described above (e.g. in equations (1a) and (1b) and in equations (16) and (17)), the skeletal subsystem is coupled to the soft-tissue subsystem via the coupling impulse $p_A$ resulting from the attachment constraints between the skeletal subsystem and the soft-tissue subsystem (e.g. associated with tendons)—see above description of equation (16). In this embodiment, as describe above in connection with FIGS. 11-13, skeletal subsystem dynamics and soft-tissue subsystem dynamics are solved in a staggered way (e.g. one after the other for each time step). In other embodiments, such staggering is not necessary and skeletal subsystem dynamics and soft-tissue subsystem dynamics may be lumped into a single QP and solved simultaneously for each time step.
- The above description describes embodiments where a skeletal subsystem model, a soft-tissue subsystem model and an Eulerian grid representation are maintained for each body segment, each body segment comprising a rigid body subsystem comprising one or more rigid-body objects and a soft-tissue subsystem comprising one or more soft-tissue objects. Such embodiments comprise maintaining a mapping $\phi_1$ from the Eulerian intermediate space 20 to physical space 16 for each body segment, and the mapping $\phi_1$ is same throughout the body segment. The mapping $\phi_1$ may be piecewise continuous as between adjacent body segments. In such embodiments, the Eulerian grid corresponding to each body segment may be rotated and/or translated by the mapping $\phi_1$, but, for a given body segment, the positions of the Eulerian vertices y do not change relative to one another. This division of the model into piecewise continuous body segments is not necessary. In some embodiments, a plurality of body segments may be modelled using a single Eulerian grid, with a mapping $\phi_1$ which is permitted to vary over the Eulerian grid. In such embodiments, the mapping $\phi_1$ may deform the Eulerian grid such that the positions of the Eulerian vertices y change relative to one another. Such embodiments may comprising using graphical methods, such as free form deformation, skinning and/or the like, which can determine a surface mesh comprising physical space coordinates x for each Eulerian vertex y. Physical space coordinates determined using such graphical methods may resemble the gross-surface shape of the objects spanning the plurality of body segments. Such graphical methods may be used as a basis for determining a mapping $\phi_1$ which is permitted to vary over the Eulerian grid. When this mapping $\phi_1$ is applied to the Eulerian grid, the result in physical space 16 would be an approximation of the shape of the objects spanning the plurality of body segments. An example of this implementation for an arm having multiple body segments is shown in FIGS. 14A and 14B. It can be seen from FIGS. 14A and 14B, that the Eulerian grid 16' is permitted to deform, particularly in the region 17 of the elbow.
- This description describes embodiments which output the shapes of various objects in one, two or three dimensions in physical space 16 (e.g. see shapes 132 of FIG. 11). In general, however, physical space 16 and the shapes of objects in physical space may have any one or more dimensions. Similarly, dimensions of objects in other spaces (e.g. active space 24, material space 12 and/or intermediate space 20) may have any of one or more dimensions.
- Some embodiments may comprise a quasi-static simulation approach, wherein the musculoskeletal system model 10 is permitted to reach an equilibrium state, which may minimize the overall potential energy, in each time step $t_n$. In some exemplary quasi-static simulation embodiments, for each real time step $t_n$, the dynamics problem (e.g. the QPs of equations (1a) and (1b) or (16) and (17)) may be repeatedly solved with significant damping until the musculoskeletal system model 10 reaches equilibrium. In such embodiments, each time step $t_n$ may be provided with an artificial time step $t_k$, k=0, 1, 2, 3, . . . . In such embodiment, the mass of the various soft-tissue and/or rigid body objects and/or the damping need not be constant and may be varied to make the quasi-static simulation converge more rapidly to equilibrium at each time step.
- The methods described above may be used to determine rigid body shapes in physical space 16 over a series of time steps based on an input activation level α given over the series of time steps (see output 132 of method 100 (FIG. 11)). These rigid-body shapes may be based on the configuration variable q described above. In this sense, we may consider the above-described process of generating the rigid body configuration variable q to be a general function $f$ of $\alpha$ over the series of time steps—i.e. $q=f(\alpha)$, where the function $f$ may be understood to be a general function incorporating the constraints discussed above. This function $f$ may be many-to-one, as different sequences of $\alpha$ over the series of time steps may produce the same rigid body configuration variable q. In some embodiments, it may be desirable to obtain, as input, the motion of the rigid bodies (e.g. in physical space 16 or in terms of the rigid body configuration variable q) over the series of time steps and to determine the corresponding activation level $\alpha$ over the series of time steps. Because of the potential many-to-one relationship between $\alpha$ and q, some embodiments may comprise additional techniques or criteria for resolving this ambiguity. By way of non-limiting example, some embodiments may comprise obtaining, as input, the motion of the rigid bodies (e.g. in physical space 16 or in terms of the rigid body configuration variable q) over the series of time steps and determining activation level $\alpha$ over the series of time steps which has the smallest magnitude that produces the prescribed q over the series of time steps. For example, this may be formulated as the following optimization problem $$\alpha^* = \underset{\alpha}{\operatorname{argmin}}(\|q - f(\alpha)\|^2 + \lambda\|\alpha\|^2) \qquad (20)$$

where $\lambda$ is a weighting parameter and $\|\ \|$ indicates a suitable norm operator—i.e. a measure of size. Different norms are possible, such as the 2-norm or the 1-norm. The equation (20) optimization may be solved with any known optimization techniques. The equation (20) technique is not the only technique available for resolving the ambiguity in $\alpha$. Any of a wide variety of other techniques could be used. For example, $\alpha$ may be selected at each time step to minimize the difference between $\alpha$ at the current time step and $\alpha$ at a previous time step and/or the like.

Various embodiments described above generate animations comprising ordered sequences of complete or partial digital image frames often referred to as CGI animation data or CGI video data. The term CGI is widely used to describe animations used in the fields of motion picture, computer games, virtual reality applications and/or the like, but as used herein, CGI animation should be understood to be general in its application. By way of non-limiting example, animations generated according to the techniques described herein may be used, in some embodiments for biomedial visualization.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A computer-implemented method for simulating a shape of a musculoskeletal system comprising a skeletal subsystem and a soft-tissue subsystem, the method comprising:

saving, in a memory accessible to a computer system, a skeletal subsystem model comprising one or more rigid bodies and one or more rigid body variables, the one or more rigid body variables representative of shapes of the one or more rigid bodies in a physical space at at least one specific time;

saving, in the memory accessible to the computer system, a soft-tissue subsystem model, the soft-tissue subsystem model representative of the soft-tissue subsystem, the soft-tissue subsystem model comprising one or more deformable soft-tissue objects and, for each of the one or more soft-tissue objects, a soft-tissue object representation of the soft-tissue object in an Eulerian space comprising a plurality of vertices, the soft-tissue object representation comprising an associated Eulerian representation for each vertex, the Eulerian representation specifying which one or more material space coordinates from among a set of material space coordinates for the soft-tissue object correspond to the vertex at the at least one specific time;

simulating, by the computer system, an evolution of the skeletal subsystem model over a series of time steps to thereby determine updated values for the one or more rigid body variables at each time step of the series of time steps;

simulating, by the computer system, an evolution of the soft-tissue subsystem model over the series of time steps to thereby determine, for each of the one or more soft tissue objects, an updated soft-tissue object representation and an updated associated Eulerian representation for each vertex in the Eulerian space at each time step in the series of time steps, the updated associated Eulerian representation, for each vertex and for each time step in the series of time steps, specifying which one or more material space coordinates for the soft-tissue object correspond to the vertex at the time step;

saving, in the memory accessible to the computer system, the updated values for the one or more rigid body variables and the updated soft-tissue object representation for each of the one or more soft-tissue objects at each time step of the series of time steps; and generating, by the computer system or a second computer system having access to the skeletal subsystem model and the soft-tissue subsystem model, an animation comprising, for each time step in the series of time steps, a corresponding digital image of at least a portion of a body incorporating the musculoskeletal system, wherein generating the animation is based at least in part on the skeletal subsystem model and the soft-tissue sub-system model; and saving the animation in a memory accessible to the computer system or the second computer system;

wherein simulating the evolution of the skeletal subsystem model and the soft-tissue subsystem model over the series of time steps comprises coupling the skeletal subsystem model and the soft-tissue subsystem model to one another using one or more coupling constraints, the one or more coupling constraints constraining the evolution of the skeletal subsystem model and the soft-tissue subsystem model over the series of time steps.

2. The computer-implemented method according to claim 1 wherein simulating the evolution of the soft-tissue subsystem model comprises, for each of the one or more soft-tissue objects: determining, by the computer system, soft-tissue variables representative of a shape of the soft-tissue object in the physical space at each time step of the series of time steps and saving, in the memory accessible to the computer system, the soft-tissue variables at each time step in the series of time steps.

3. The computer-implemented method according to claim 1 comprising determining, by the computer system, a mapping, $\phi_1$, from the Eulerian space to physical space for each time step the series of time steps and saving, in the memory accessible to the computer system, the mapping, $\phi_1$, at each time step in the series of time steps.

4. The computer-implemented method according to claim 3 wherein the mapping, $\phi_1$, from the Eulerian space to the physical space comprises translation and rotation of the Eulerian space.

5. The computer-implemented method according to claim 3 wherein the mapping, $\phi_1$, from the Eulerian space to the physical space comprises deformation of the Eulerian space, wherein the deformation of the Eulerian space comprises relative movement between individual vertices of the Eulerian space.

6. The computer-implemented method according to claim 3 wherein, for each time step, determining the mapping, $\phi_1$, is based, at least in part, on the rigid body variables representative of the shape of the one or more rigid bodies during the time step.

7. The computer-implemented method according to claim 3 wherein the one or more coupling constraints comprise, for each of the one or more soft-tissue objects, application of the mapping, $\phi_1$, to the soft-tissue object representation.

8. The computer-implemented method according to claim 3 comprising:
generating, by the computer system or a second computer system having access to the skeletal subsystem model and the soft-tissue subsystem model, an animation comprising, for each time step in the series of time steps, a corresponding digital image of at least a portion of a body incorporating the musculoskeletal system, wherein generating the animation is based at least in part on the rigid body variables and the mapping, $\phi_1$, over the series of time steps; and
saving the animation in a memory accessible to the computer system or the second computer system.

9. The computer-implemented method according to claim 1 wherein simulating the evolution of the skeletal subsystem model comprises obtaining, as input, the updated values for the one of more rigid body variables representative of the shapes of the one or more rigid bodies in the physical space over the series of time steps and wherein simulating the evolution of the soft-tissue subsystem model comprises, for each time step in the series of time steps, solving, by the computer system, a system of equations representing the dynamics of the soft-tissue subsystem subject to the one or more coupling constraints.

10. The computer-implemented method according to claim 9 wherein solving the system of equations comprises, for each of the one or more soft tissue objects: determining by the computer system, at least one of soft-tissue variables representative of the shape of the soft-tissue object in the physical space for each time step in the series of time steps and a mapping, $\phi_1$, from the Eulerian space to physical space for each time step the series of time steps based, at least in part, on a solution to the system of equations representing the dynamics of the soft-tissue subsystem; and saving, in the memory accessible to the computer system, the at least one of the soft-tissue variables and the mapping, $\phi_1$, at each time step in the series of time steps.

11. The computer-implemented method according to claim 1 wherein the one or more soft-tissue objects comprise at least one activatable soft-tissue object and wherein the method comprises obtaining, as input, an activation level $\alpha$ for each time step in the series of time steps for the at least one activatable soft-tissue object, wherein for each time step, constitutive properties of the soft-tissue subsystem model for the at least one activatable soft-tissue object are based, at least in part, on the activation level $\alpha$.

12. The computer-implemented method according to claim 1 wherein the one or more soft-tissue objects comprise at least one activatable soft-tissue object and wherein the method comprises obtaining, as input, an activation level $\alpha$ for each time step in the series of time steps for the at least one activatable soft-tissue object, wherein, for each time step, a stress-free shape $\tilde{X}$ of the at least one activatable soft-tissue object depends on the activation level.

13. The computer-implemented method according to claim 12 wherein, for a given activation level $\alpha$, the stress-free shape $\tilde{X}$ is based, at least in part, on medical image data.

14. The computer-implemented method according to claim 12 wherein, for a given activation level $\alpha$, the stress-free shape $\tilde{X}$ is based, at least in part, on one or more human- or computer-generated artistic renderings of the corresponding stress-free shapes of the at least one activatable soft-tissue object.

15. The computer-implemented method according to claim 11 wherein simulating the evolution of the soft-tissue subsystem model comprises, for each time step in the series of time steps, solving, by the computer system, a system of equations representing the dynamics of the soft-tissue subsystem subject to the one or more coupling constraints, wherein, for each time step, the system of equations representing the dynamics of the soft-tissue subsystem is dependent on the activation level $\alpha$ of the at least one activatable soft-tissue object.

16. The computer-implemented method according to claim 15 comprising, for each of the one or more soft tissue objects: determining, by the computer system, at least one of soft-tissue variables representative of the shape of the soft-tissue object in the physical space for each time step in the series of time steps and a mapping, $\phi_1$, from the Eulerian space to physical space for each time step the series of time steps based, at least in part, on a solution to the system of equations representing the dynamics of the soft-tissue subsystem; and saving, in the memory accessible to the computer system, the at least one of the soft-tissue variables and the mapping, $\phi_1$, at each time step in the series of time steps.

17. The computer-implemented method according to claim 12 wherein simulating the evolution of the soft-tissue subsystem model comprises, for each time step in the series of time steps, solving, by the computer system, a system of equations representing the dynamics of the soft-tissue subsystem subject to the one or more coupling constraints, wherein, for each time step, the system of equations representing the dynamics of the soft-tissue subsystem is dependent on the corresponding stress-free shape $\tilde{X}$ of the at least one activatable soft-tissue object.

18. The computer-implemented method according to claim 17 comprising, for each of the one or more soft tissue objects: determining, by the computer system, at least one of soft tissue variables representative of the shape of the soft-tissue object in the physical space for each time step in the series of time steps and a mapping, $\phi_1$, from the Eulerian space to physical space for each time step the series of time steps based, at least in part, on a solution to the system of equations representing the dynamics of the soft-tissue subsystem; and saving, in the memory accessible to the computer system, the at least one of the soft-tissue variables and the mapping, $\phi_1$, at each time step in the series of time steps.

19. The computer-implemented method according to claim 15 comprising obtaining, as input, the updated values for the one of more rigid body variables representative of the shapes of the one or more rigid bodies in the physical space for each time step in the series of time steps and, for each of the one or more soft tissue objects, determining, by the computer system, at least one of soft-tissue variables representative of the shape of the soft-tissue object in the physical space for each time step in the series of time steps and a mapping, $\phi_1$, from the Eulerian space to physical space for each time step the series of time steps based, at least in part, on a solution to the system of equations representing the dynamics of the soft-tissue subsystem; and saving, in the memory accessible to the computer system, the at least one of the soft-tissue variables and the mapping, $\phi_1$, at each time step in the series of time steps.

20. The computer-implemented method according to claim 9 wherein solving the system of equations comprises permitting the musculoskeletal system simulation to reach an equilibrium state in each time step.

21. The computer-implemented method according to claim 9 comprising obtaining, as input, one or more external forces applied to the musculoskeletal system and wherein the method comprises formulating the system of equations representing the dynamics of the soft-tissue subsystem based, at least in part, on the one or more external forces.

22. The computer-implemented method according to claim 9 comprising obtaining, as input, shapes of one or more external objects in the physical space over the series of time steps and wherein the method comprises constructing, by the computer system, contact constraints based on the shapes of one or more external objects in the physical space over the series of time steps and wherein solving the system of equations representing the dynamics of the soft-tissue subsystem subject to the one or more coupling constraints comprises solving the system of equations representing the dynamics of the soft-tissue subsystem subject to the one or more coupling constraints and the contact constraints.

23. The computer-implemented method according to claim 1 wherein the coupling constraints comprise one or more attachment constraints, each attachment constraint specifying a surface region of a corresponding soft-tissue object where a shape of the corresponding soft-tissue object in the physical space is constrained by the shape of one or more corresponding rigid-body objects in the physical space over the series of time steps.

24. The computer-implemented method according to claim 23 wherein, for at least one of the one or more attachment constraints, the one or more corresponding rigid body objects comprise a plurality of rigid body objects and the at least one of the one or more attachment constraints comprises constraining the velocity of the Eulerian representation associated with the corresponding soft-tissue object on the surface region to be equal to a velocity which is a function of the shape of the plurality of corresponding rigid-body objects in the physical space and a moment arm between each pair of the plurality of corresponding rigid body objects over the series of time steps.

25. The computer-implemented method according to claim 1 wherein simulating the evolution of the skeletal subsystem model and the soft-tissue subsystem model over the series of time steps comprise constraining the soft-tissue subsystem model according to a volume-preservation constraint which tends to preserve the volume of one or more soft-tissue objects over the series of time steps, the volume preservation constraint constraining the evolution of the skeletal subsystem model and the soft-tissue subsystem model over the series of time steps.

26. The computer-implemented method according to claim 25 wherein the volume-preservation constraint comprises, for each soft-tissue object, constraining a time integral of a rate of change of volume of the soft-tissue object with respect to time tend toward zero over the series of time steps.

27. The computer-implemented method according to claim 1 wherein simulating the evolution of the skeletal subsystem model and the soft-tissue subsystem model over the series of time steps comprise constraining the soft-tissue subsystem model according to one or more close-contact constraints, each close contact constraint between a pair of objects comprising a first soft-tissue object and a second object which is either a soft-tissue object or a rigid body object, each close contact constraint maintaining contact between portions of the corresponding pair of objects while permitting sliding movement between corresponding pair of objects.

28. The computer-implemented method according to claim 27, wherein for each close contact constraint where the second object is a soft-tissue object, the close contact constraint comprises, for each Eulerian cell subject to the close contact constraint, constraining a dot product of a relative velocity between the pair of objects in the Eulerian cell and a representation of a surface normal for a portion of the Eulerian cell where the pair of objects are in contact to be zero.

29. The computer-implemented method according to claim 1 wherein the skeletal subsystem model comprises a plurality of body segments, each body segment comprising one or more rigid bodies and, for each rigid body, segment rigid body variables representative of shapes of the rigid body in a physical space for each time step in the series of time steps and each body segment comprising one or more deformable soft-tissue objects and, for each of the one or more soft-tissue objects, a representation of the soft-tissue object in an Eulerian space comprising a plurality of vertices, the soft-tissue object representation comprising an associated Eulerian representation for each vertex, the Eulerian representation specifying which one or more material space coordinates from among a set of material space coordinates for the soft-tissue object correspond to the vertex at each time step in the series of time steps.

30. A computer system comprising one or more processors, the one or more processors configured to perform the computer-implemented method of claim 1.

31. The computer-implemented method of claim 9, wherein the system of equations comprises at least one inequality.

32. The computer-implemented method of claim 15, wherein the system of equations comprises at least one inequality.

33. The computer-implemented method of claim 17, wherein the system of equations comprises at least one inequality.

34. A computer-implemented method for simulating a shape of a musculoskeletal system comprising a skeletal subsystem and a soft-tissue subsystem, the method comprising:

saving, in a memory accessible to a computer system, a skeletal subsystem model comprising one or more rigid bodies and one or more rigid body variables, the one or more rigid body variables representative of shapes of the one or more rigid bodies in a physical space at at least one specific time;

saving, in the memory accessible to the computer system, a soft-tissue subsystem model, the soft-tissue subsystem model representative of the soft-tissue subsystem, the soft-tissue subsystem model comprising one or more deformable soft-tissue objects and, for each of the one or more soft-tissue objects, a soft-tissue object representation of the soft-tissue object in an Eulerian space comprising a plurality of vertices, the soft-tissue object representation comprising an associated Eulerian representation for each vertex, the Eulerian representation specifying which one or more material space coordinates from among a set of material space coordinates for the soft-tissue object correspond to the vertex at the at least one specific time;

simulating, by the computer system, an evolution of the skeletal subsystem model over a series of time steps to thereby determine updated values for the one or more rigid body variables at each time step of the series of time steps;

simulating, by the computer system, an evolution of the soft-tissue subsystem model over the series of time steps to thereby determine, for each of the one or more soft tissue objects, an updated soft-tissue object representation and an updated associated Eulerian representation for each vertex in the Eulerian space at each time step in the series of time steps, the updated associated Eulerian representation, for each vertex and for each time step in the series of time steps, specifying which one or more material space coordinates for the soft-tissue object correspond to the vertex at the time step;

saving, in the memory accessible to the computer system, the updated values for the one or more rigid body variables and the updated soft-tissue object representation for each of the one or more soft-tissue objects at each time step of the series of time steps;

generating, by the computer system or a second computer system having access to the skeletal subsystem model and the soft-tissue subsystem model, an animation comprising, for each time step in the series of time steps, a corresponding digital image of at least a portion of a body incorporating the musculoskeletal system, wherein generating the animation is based at least in part on the rigid body variables and the soft-tissue variables over the series of time steps; and saving the animation in a memory accessible to the computer system or the second computer system;

wherein simulating the evolution of the skeletal subsystem model and the soft-tissue subsystem model over the series of time steps comprises coupling the skeletal subsystem model and the soft-tissue subsystem model to one another using one or more coupling constraints, the one or more coupling constraints constraining the evolution of the skeletal subsystem model and the soft-tissue subsystem model over the series of time steps; and wherein simulating the evolution of the soft-tissue subsystem model comprises, for each of the one or more soft-tissue objects: determining, by the computer system, soft-tissue variables representative of a shape of the soft-tissue object in the physical space at each time step of the series of time steps and saving, in the memory accessible to the computer system, the soft-tissue variables at each time step in the series of time steps.

35. A computer program product comprising computer-readable instructions embodied on non-transitory media, which, when executed by a suitable computer or processor, cause the computer or processor to perform the computer-implemented method of claim 1.

* * * * *